(12) United States Patent
Kim

(10) Patent No.: US 11,173,605 B2
(45) Date of Patent: Nov. 16, 2021

(54) METHOD OF CONTROLLING MOBILE ROBOT, APPARATUS FOR SUPPORTING THE METHOD, AND DELIVERY SYSTEM USING MOBILE ROBOT

(71) Applicant: dogugonggan Co., Ltd., Gangwon-do (KR)

(72) Inventor: Jin Hyo Kim, Seoul (KR)

(73) Assignee: dogugonggan Co., Ltd., Gangwon-do (KR)

( * ) Notice: Subject to any disclaimer, the term of this patent is extended or adjusted under 35 U.S.C. 154(b) by 449 days.

(21) Appl. No.: 16/199,990

(22) Filed: Nov. 26, 2018

(65) Prior Publication Data
US 2019/0262992 A1 Aug. 29, 2019

(30) Foreign Application Priority Data

Feb. 26, 2018 (KR) .................. 10-2018-0022957
Apr. 20, 2018 (KR) .................. 10-2018-0046018
Nov. 2, 2018 (KR) .................. 10-2018-0133322

(51) Int. Cl.
*B25J 9/16* (2006.01)
*B25J 13/08* (2006.01)
(Continued)

(52) U.S. Cl.
CPC .......... *B25J 9/1666* (2013.01); *B25J 9/1602* (2013.01); *B25J 9/162* (2013.01); *B25J 9/1653* (2013.01);
(Continued)

(58) Field of Classification Search
USPC ................................ 700/245–264
See application file for complete search history.

(56) References Cited

U.S. PATENT DOCUMENTS 7,082,351 B2 * 7/2006 Hara .................. B25J 9/1682
318/568.16
2009/0018712 A1 * 1/2009 Duncan ................ G09B 19/167
701/2
(Continued)

FOREIGN PATENT DOCUMENTS

JP 2003251581 A 9/2003
JP 2004260769 A 9/2004
(Continued)

OTHER PUBLICATIONS

Korean Intellectual Property Office, Office Action for Korean Application No. 10-2018-0133322, dated Nov. 23, 2020. 6 pages.
(Continued)

*Primary Examiner* — Jonathan L Sample
(74) *Attorney, Agent, or Firm* — SoCal IP Law Group LLP; Jonathan Pearce

(57) ABSTRACT

Provided are a method of controlling a mobile robot, apparatus for supporting the method, and delivery system using the mobile robot. The method, which is performed by a control apparatus, comprises acquiring a first control value for the mobile robot, which is input through a remote control apparatus, acquiring a second control value for the mobile robot, which is generated by an autonomous driving module, determining a weight for each control value based on a delay between the mobile robot and the remote control apparatus and generating a target control value of the mobile robot in combination of the first control value and the second control value based on the determined weights, wherein a first weight for the first control value and a second weight for the second control value are inversely proportional to each other.

9 Claims, 33 Drawing Sheets

(51) Int. Cl.

| | | |
|---|---|---|
| *B25J 19/02* | (2006.01) | |
| *G05D 1/00* | (2006.01) | |
| *G05D 1/02* | (2020.01) | |
| *G06K 9/00* | (2006.01) | |
| *B64C 39/02* | (2006.01) | |

(52) U.S. Cl.
 CPC ........... *B25J 13/086* (2013.01); *B25J 19/023* (2013.01); *B64C 39/024* (2013.01); *G05D 1/0088* (2013.01); *G05D 1/0234* (2013.01); *G05D 1/0246* (2013.01); *G06K 9/00805* (2013.01); *B64C 2201/128* (2013.01); *B64C 2201/141* (2013.01); *G05D 2201/0213* (2013.01)

(56) References Cited

U.S. PATENT DOCUMENTS

| | | | | |
|---|---|---|---|---|
| 2015/0127155 | A1* | 5/2015 | Passot | B25J 9/161 700/257 |
| 2015/0202768 | A1* | 7/2015 | Moridaira | B62D 57/032 700/258 |
| 2015/0306761 | A1* | 10/2015 | O'Connor | B25J 9/16 700/250 |
| 2016/0008984 | A1* | 1/2016 | Ju | G06T 3/40 700/259 |
| 2016/0096270 | A1* | 4/2016 | Ibarz Gabardos | B25J 9/161 700/253 |
| 2017/0305014 | A1* | 10/2017 | Gildert | B25J 9/1664 |

FOREIGN PATENT DOCUMENTS

| | | |
|---|---|---|
| JP | 2011043884 A | 3/2011 |
| JP | 2014016858 A | 1/2014 |
| KR | 10-0914904 | 8/2009 |
| KR | 10-0914904 B | 8/2009 |
| KR | 1020130038074 A | 4/2013 |
| KR | 10-1293247 | 7/2013 |
| KR | 10-1465706 | 11/2014 |
| KR | 10-2016-0123623 A | 10/2016 |
| KR | 10-1671641 | 10/2016 |
| KR | 10-2017-0013450 A | 2/2017 |
| KR | 10-1749578 | 6/2017 |
| KR | 10-2017-0087385 A | 7/2017 |
| KR | 10-2017-0104901 A | 9/2017 |
| KR | 10-2018-0070624 A | 6/2018 |

OTHER PUBLICATIONS

Korean Intellectual Property Office, Office Action for Korean Application No. 10-2018-0133322, dated May 21, 2020. 8 pages.

Cho, Sungwook et al., "Development of a Cooperative Heterogeneous Unmanned System for Delivery Services," Journal of Institute of Control, Robotics and Systems (2014) 20(12):1181-1188. 9 pages.

Korean Intellectual Property Office, Notice of Allowance for Korean Application No. 10-2008-0046018, dated Dec. 28, 2018.

* cited by examiner

METHOD OF CONTROLLING MOBILE ROBOT, APPARATUS FOR SUPPORTING THE METHOD, AND DELIVERY SYSTEM USING MOBILE ROBOT

This application claims priority from Korean Patent Application No. 10-2018-0022957 filed on Feb. 26, 2018, No. 10-2018-0046018 filed on Apr. 20, 2018 and No. 10-2018-0133322 filed on Nov. 2, 2018 in the Korean Intellectual Property Office, the disclosure of all of which are hereby incorporated by reference in its entirety.

BACKGROUND

1. Field of the Disclosure

The present disclosure relates to a method of controlling a mobile robot, an apparatus for supporting the control method, and a delivery system using a mobile robot, and more particularly, to a method of controlling a mobile robot designed to solve a problem that causes an increase in a risk of accident of a mobile robot and a problem that causes a user's sense of difference in operation due to a communication delay between a remote control system and a mobile robot, a control apparatus for supporting the control method, and various delivery systems using one or more mobile robots.

2. Description of the Related Art

Recently, interest in autonomous mobile robots such as a self-driving vehicle has increased. However, research on autonomous mobile robots is still in its infancy, and most robot systems include a remote control system for an operator to control a mobile robot at a remote location.

In a system for controlling a mobile robot at a remote location through the remote control system, the most problematic is a communication delay that may occur during a wireless communication process. As shown in FIG. 1, the communication delay includes a control delay 5 that occurs while a mobile robot 3 receives a control signal of a remote control system 1 and a monitoring delay 7 that occurs while the remote control system 1 receives images of the surroundings of the mobile robot 3 from the mobile robot 3.

The two delays 5 and 7 are main factors that increase a risk of accident of the mobile robot. This is because a user may later recognize an obstacle near the mobile robot 3 because of the monitoring delay 7 and a control signal of an operator may later reach the mobile robot 3 because of the control delay 5.

Conventionally, the above problems have been mainly solved by changing the driving mode of a mobile robot to an autonomous driving mode when the communication delay exceeds a threshold value. That is, when remote control is not easy due to the communication delay, a method of avoiding the risk of accident by giving authority to control the mobile robot to an autonomous driving module is mainly used. However, as shown in FIG. 2, iterative mode changes during the operation of the mobile robot may discontinuously generate a final control value 15. As a result, the mobile robot may be unstably operated (e.g., a robot control value changes suddenly at times T1, T2, and T3) and thus a user may lose his or her attention. Furthermore, the sudden change to the autonomous driving mode may cause an operator's sense of difference in robot control to be maximized.

Accordingly, to control a mobile robot at a remote location, a mobile robot control method capable of solving problems about a mobile robot's safety and a user's sense of difference is required.

Meanwhile, recently, as technology for ground robots or drones evolves, many attempts have been made to apply such technology to delivery services. For example, Google is planning to utilize unmanned cars for delivery, and Amazon is trying to make a drones-based delivery service called "Prime Air." Also, Domino's, which is a global pizza delivery company, has demonstrated a service for delivering pizza using a robot. The purpose of such a delivery service is to improve customers' satisfaction by delivering goods to users more quickly and to increase delivery efficiency by reducing labor costs.

However, much research still has to be done in order for a delivery service using ground robots and drones to be put to practical use in various environments. For example, in order for the delivery service to be put to practical use, research should be done on various topics such as a collaborative delivery method using ground robots and drones, a large-size item delivery method using a plurality of drones, and a method of safely delivering a fragile item such as food.

SUMMARY

Aspects of the present disclosure provide a control method for a mobile robot and an apparatus for supporting the control method, the control method being capable of solving a problem of increasing a risk of accident of a mobile robot, which occurs due to a communication delay.

Aspects of the present disclosure also provide a control method for a mobile robot and an apparatus for supporting the control method, the control method being capable of solving a problem of a user's sense of difference in robot operation due to a communication delay and/or iterative mode changes.

Aspects of the present disclosure also provide a system for providing a delivery service using a mobile robot and a method of operating the system.

Aspects of the present disclosure also provide a system for providing a collaborative delivery service using both of a ground robot and a drone and a method of operating the system.

Aspects of the present disclosure also provide a method of safely delivering a large item using a plurality of drones.

Aspects of the present disclosure also provide a method of safely delivering a fragile item such as food.

It should be noted that objects of the present disclosure are not limited to the above-described objects, and other objects of the present disclosure will be apparent to those skilled in the art from the following descriptions.

According to an aspect of the present disclosure, there is provided a method of controlling a mobile robot. The method being performed by a control apparatus comprises acquiring a first control value for the mobile robot, which is input through a remote control apparatus, acquiring a second control value for the mobile robot, which is generated by an autonomous driving module, determining a weight for each control value based on a delay between the mobile robot and the remote control apparatus and generating a target control value of the mobile robot in combination of the first control value and the second control value based on the determined weights, wherein a first weight for the first control value and a second weight for the second control value are inversely proportional to each other.

According to another aspect of the present disclosure, there is provided a collaborative delivery system using a mobile robot. The collaborative delivery system comprises a service system configured to generate mission information for delivering an item to a delivery destination, a first mobile robot configured to transport the item based on the mission information and a second mobile robot configured to transport the item in collaboration with the first mobile robot, wherein the mission information includes collaboration information necessary for the first mobile robot and the second mobile robot to collaborate with each other According to still another aspect of the present disclosure, there is provided a food delivery system using a mobile robot. The food delivery system comprises a service system configured to receive a delivery request from a user terminal and generate mission information for delivering food to a delivery destination in response to the delivery request and a mobile robot configured to deliver the food contained in a cooking appliance based on the mission information, wherein the mission information includes a cooking time for the food, and wherein the mobile robot calculates an expected time taken to reach the delivery destination, compares the calculated expected time to the cooking time, and operates the cooking appliance based on a result of the comparison.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE EMBODIMENTS

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims. Like numbers refer to like elements throughout.

Unless otherwise defined, all terms including technical and scientific terms used herein have the same meaning as commonly understood by one of ordinary skill in the art to which this disclosure belongs. Further, it will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The terms used herein are for the purpose of describing particular embodiments only and is not intended to be limiting. As used herein, the singular forms are intended to include the plural forms as well, unless the context clearly indicates otherwise.

The terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Prior to describing the present specification, some terms used in the present specification will be described.

Herein, the term "mobile robot" collectively refers to any kinds of robots having a moving (that is, traveling) function. The mobile robot may include a ground robot having a ground movement function and a drone having an air movement function. Also, the mobile robot may include a remote control robot controlled by a remote control device (or system), an autonomous robot moving according to autonomous determination, and a semi-autonomous robot having both of a remote control function and an autonomous moving function.

Herein, the term "instruction" refers to an element of a computer program and a series of commands that are grouped on a function basis and executed by a processor.

Hereinafter, some embodiments of the present disclosure will be described in detail with reference to the accompanying drawings.

Figure 3:
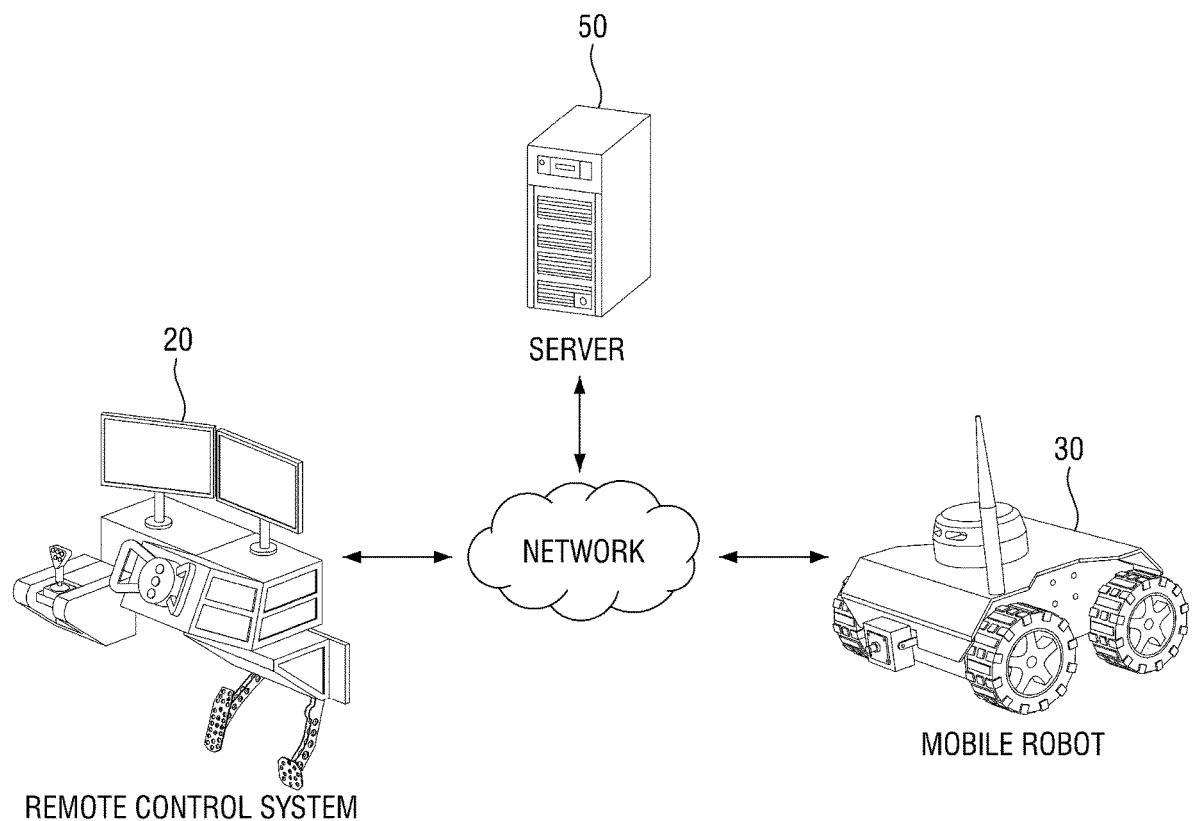
FIG. 3 is an example configuration diagram showing a robot control system according to some embodiments of the present disclosure.

FIG. 3 is an example configuration diagram showing a robot control system according to some embodiments of the present disclosure.

Referring to FIG. 3, the robot control system may be configured to include a remote control system 20, a mobile robot 30, a control apparatus 100 (not shown in FIG. 3), and a server 50. However, it should be appreciated that this is merely an example embodiment for achieving the objects of the present disclosure and some elements are added to, or deleted from, the configuration as needed. Also, elements of the robot control system shown in FIG. 3 indicate functional elements that are functionally distinct from one another. It should be noted that at least one element may be integrated with one another in an actual physical environment. For example, the control apparatus 100 may be implemented with a specific logic of the remote control system 20 or the mobile robot 30.

Also, in an actual physical environment, each of the elements may be separated into a plurality of sub-function elements. For example, the server 50 may have a first function implemented in a first computing apparatus and a second function implemented in a second computing apparatus. Each element of the robot control system will be described below.

In the robot control system, the remote control system 20 is an apparatus that is used by an operator to remotely control the mobile robot 30. The remote control system 20 may control the mobile robot 30, which is located at a remote location, by transmitting a control value (e.g., a steering angle and a speed) input by the operator to the mobile robot 30 in real time. For convenience of description, the control value input by the operator through the remote control system 20 may be referred to as a "remote control value."

To improve convenience, the remote control system 20 may be configured to include a haptic interface device such as a steering wheel, a pedal, and the like. For example, the operator may control the steering angle of the mobile robot 30 through the steering wheel and may control the speed of the mobile robot 30 through the pedal. However, the technical scope of the present disclosure is not limited thereto, and a user interface apparatus of the remote control system 20 may be implemented in an arbitrary manner.

Also, the remote control system 20 may be configured to include a display apparatus for displaying data regarding surroundings-related images captured by the mobile robot 30. Accordingly, the operator may recognize surrounding environments of the mobile robot 30 through the display apparatus and may suitably perform remote control.

In the robot control system, the mobile robot 30 is a robot that is controlled by the remote control system 20. In particular, FIG. 3 shows an example in which the mobile robot 30 is a vehicle-based ground robot. As described above, the mobile robot 30 may include any types of robots such as a drone.

In the robot control system, the control apparatus 100 is a computing apparatus that generates a target control value for controlling the mobile robot 30 based on various control values. Here, the computing apparatus may be a notebook, a desktop, a laptop, or the like. However, the present disclosure is not limited thereto, and the computing apparatus may include any kinds of devices equipped with computing means. One example of the computing apparatus will be described with reference to FIG. 33.

Since the target control value is a value that indicates a target control state (e.g., a steering angle and a speed) of the mobile robot 30, a final control value input to the mobile robot 30 may be different from the target control value. For example, the final control value may be generated by various control algorithms based on the target control value and a current control state (e.g., a current speed and a current steering angle) of the mobile robot 30. However, a detailed description thereof will be omitted in order not to obscure the subject matters of the present disclosure.

Figure 4:
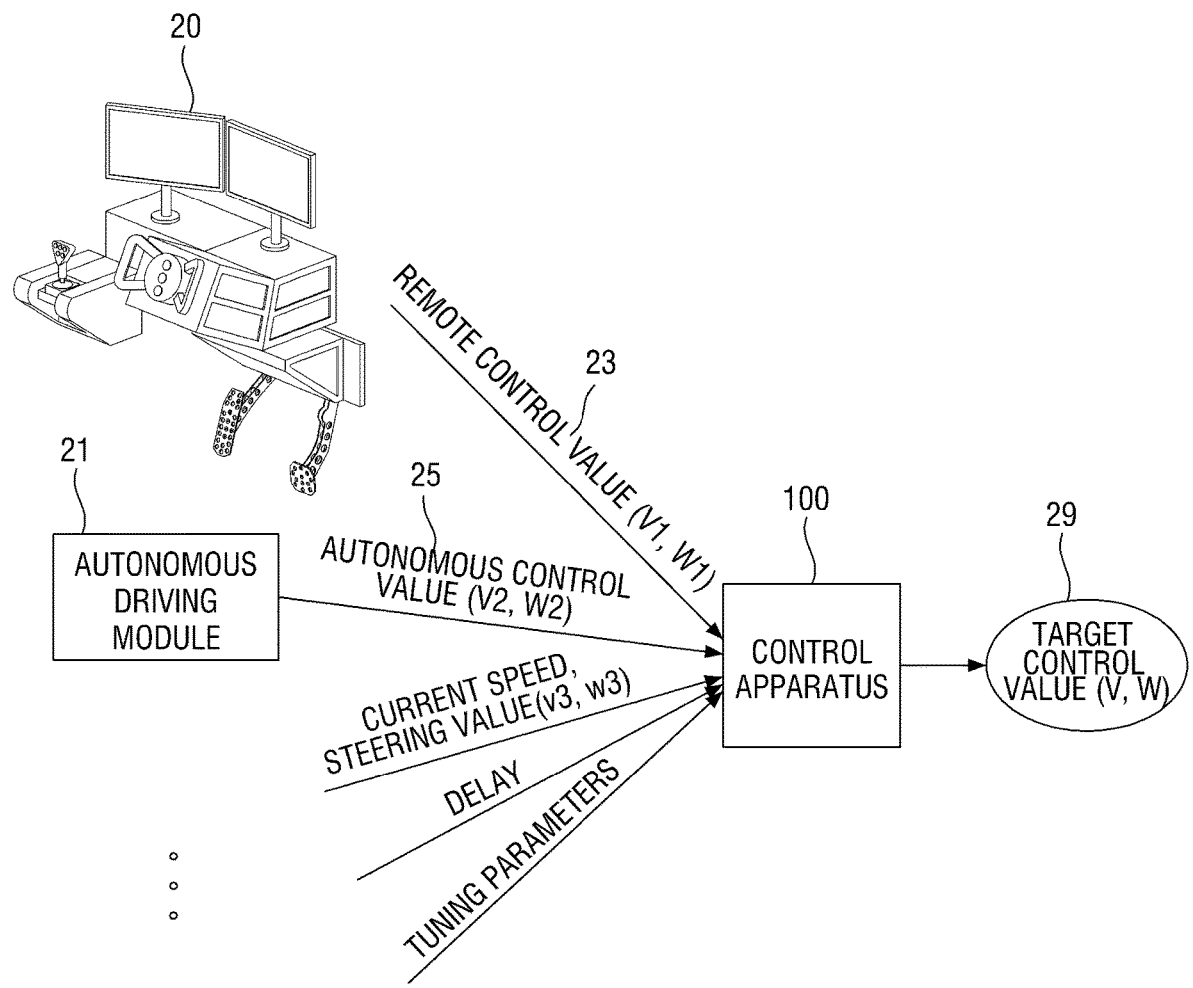
FIGS. 4 and 5 are diagrams schematically illustrating a control apparatus according to some embodiments of the present disclosure.

As shown in FIG. 4, the control apparatus 100 may generate a target control value 29 based on a remote control value 23 input through the remote control system 20, a control value 25 (hereinafter referred to as an "autonomous control value") generated by an autonomous driving module 21, and the like. In this case, the control apparatus 100 may adjust the proportions in which the remote control value 23 and the autonomous control value 25 are reflected in the target control value 29, based on various factors such as a communication delay between the remote control system 20 and the mobile robot 30, a risk of collision, and a level of complexity of surrounding environments.

Figure 2:
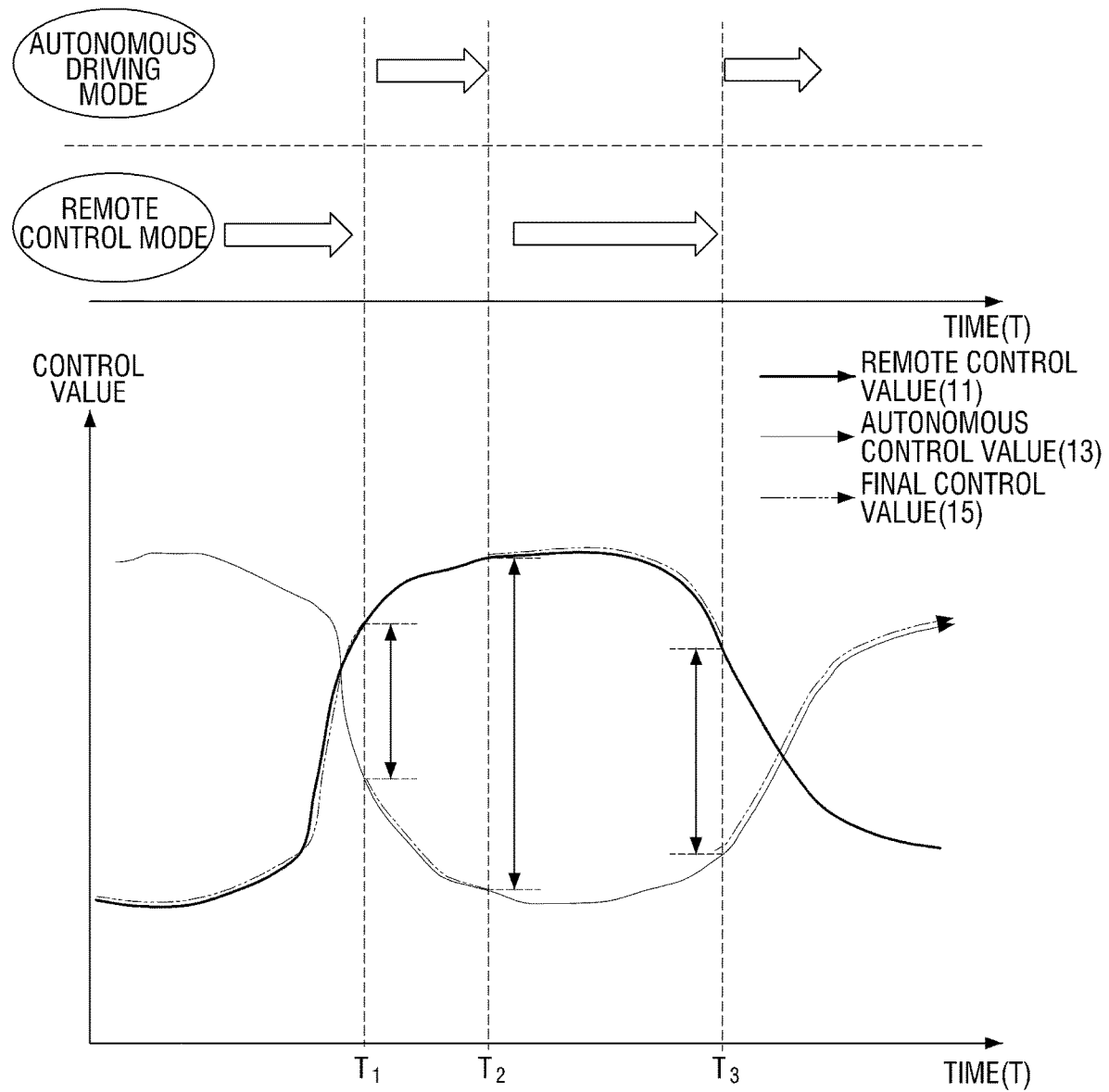
FIG. 2 is a diagram illustrating problems of a conventional mobile robot control scheme.
Figure 5:
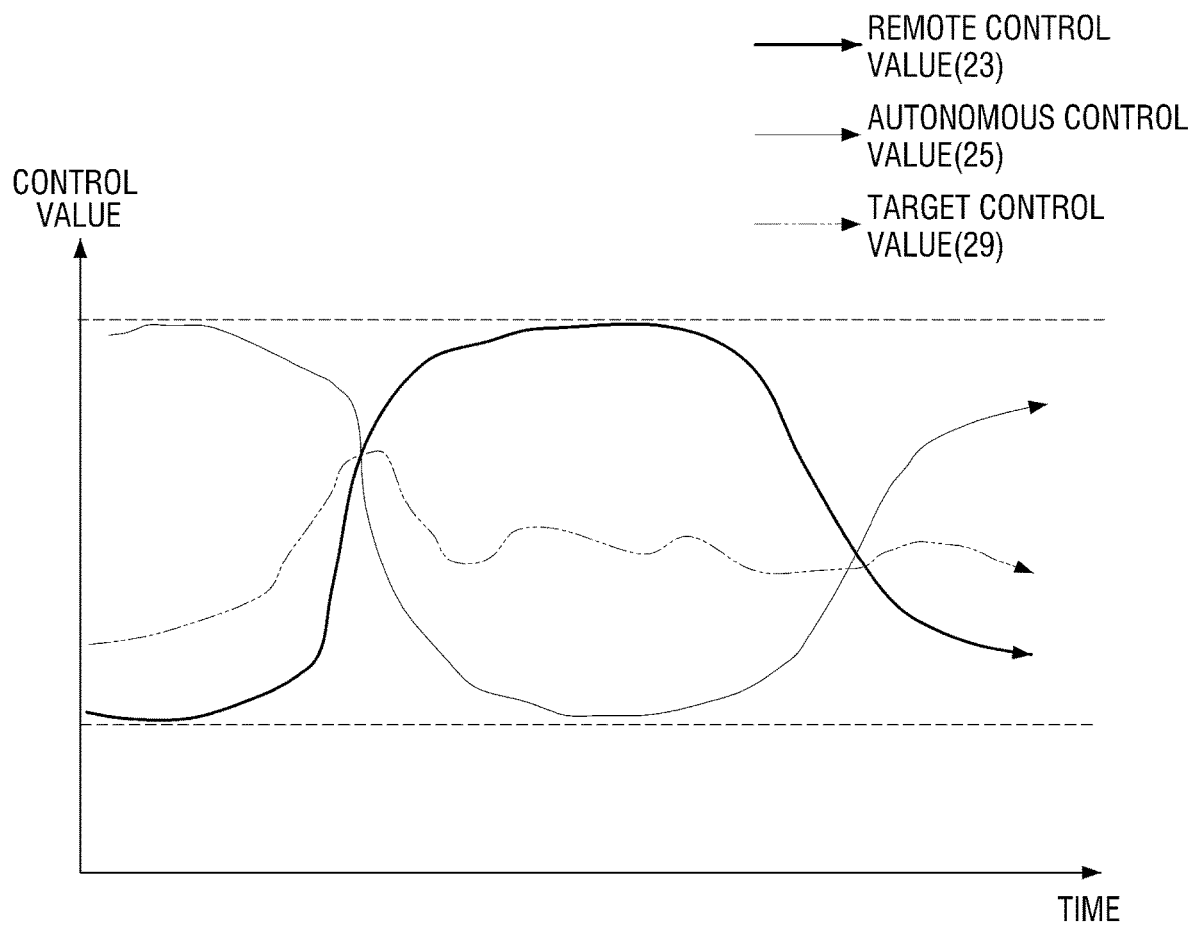

That is, the control apparatus 100 does not generate a target control value using specific control values 23 and 25 at any point, but generates the target control value 29 by suitably combining the remote control value 23 and the autonomous control value 25. Accordingly, as shown in FIG. 5, the target control value 29 generated by the control apparatus 100 appears in the form of a continuous value and does not fluctuate abruptly. Therefore, it is possible to solve a problem of a discontinuous control value being generated due to iterative control mode changes (see FIG. 2) and also to alleviate a problem of an operator feeling a sense of difference in operation. A configuration and operation of the control apparatus 100 will be described in detail with reference to FIG. 7 and subsequent drawings.

The control apparatus 100 may be implemented at a side of the mobile robot 30, but the technical scope of the present disclosure is not limited thereto. However, in order to facilitate understanding, the following description assumes that the control apparatus 100 is implemented at the side of the mobile robot 30.

In the robot control system, the server 50 is a computing apparatus that receives driving data from the remote control system 20 or the mobile robot 30, learns the driving data, and builds a machine learning model for a user's driving pattern. Here, the computing apparatus may be a notebook, a desktop, a laptop, or the like. However, the present disclosure is not limited thereto, and the computing apparatus may include any kind of device equipped with computing means and communication means.

The driving data may include, for example, control values for remote control systems 20a to 20n, sensing data (e.g., image data) of the mobile robot, and the like.

Figure 6:
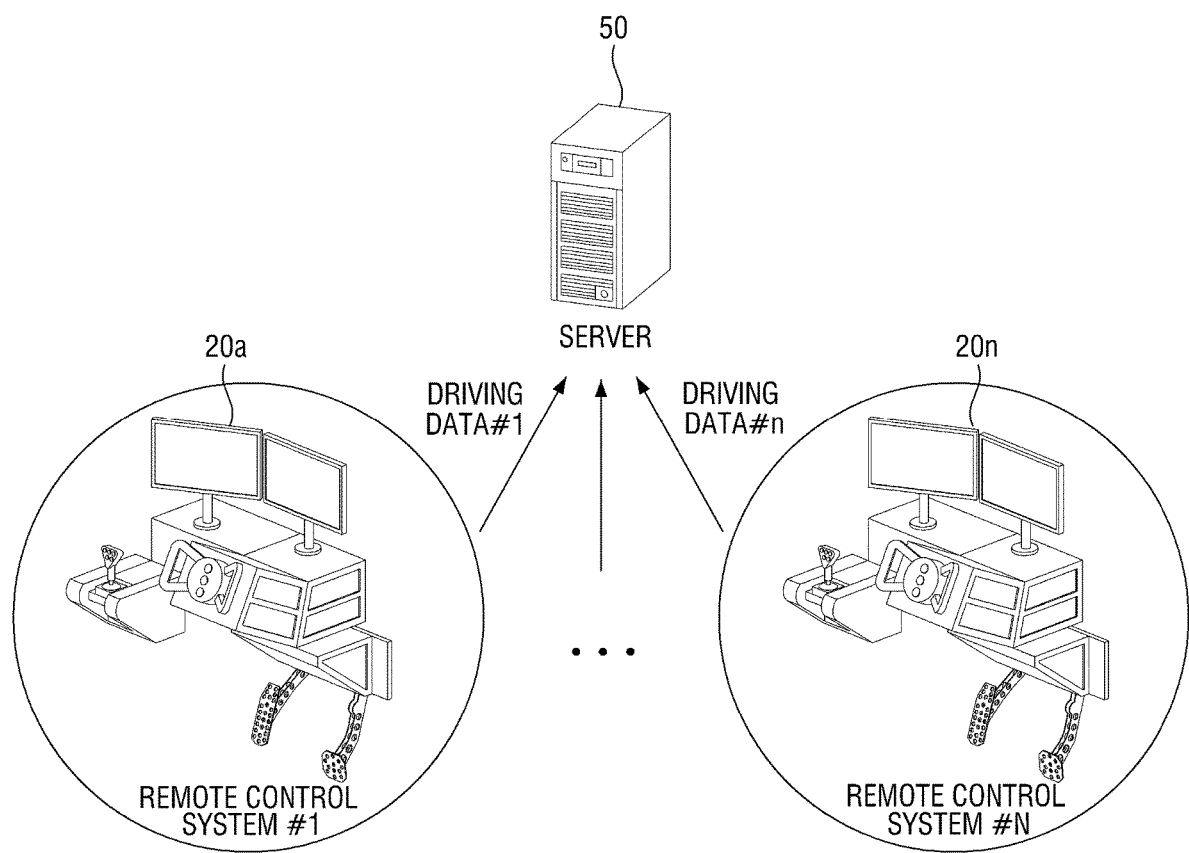
FIG. 6 is a diagram illustrating operation of a server according to some embodiments of the present disclosure.

In detail, as shown in FIG. 6, the server 50 may receive driving data of a specific user from the plurality of remote control systems 20a to 20n, learn the driving data, and build a machine learning model associated with a driving pattern of each user. Also, the server 50 may predict and provide a control value (hereinafter referred to as a "pattern control value") for the current driving environment of the mobile robot 30 through the built machine learning model. The pattern control value may also be used by the control apparatus 100 to generate the target control value, and a detailed description thereof will be described below with reference to FIG. 12. Also, an example method in which the server 50 learns the driving pattern will be described below with reference to FIG. 12.

As reference, some functions of the server 50 may be implemented in the remote control system 20 or the mobile robot 30. For example, the remote control system 20 or the mobile robot 30 may perform machine learning on a driving pattern of a specific user based on driving data and provide a machine learning model that learns the driving pattern to the server 50. In this case, the server 50 may perform only a function of providing a predetermined pattern control value to the control apparatus 100 using the machine learning model that learns driving patterns of a plurality of users.

At least some of the elements 20, 30, 50, and 100 of the robot control system may communicate over a network. A network between the remote control system 20 and the mobile robot 30 may be typically implemented with a wireless network, but the technical scope of the present disclosure is not limited thereto. That is, the network may be implemented with any type of network such as a local area network (LAN), a wide area network (WAN), a mobile radio communication network, and a wireless broadband Internet (WiBro).

The robot control system according to an embodiment of the present disclosure has been described with reference to FIGS. 3 to 6. Subsequently, the configuration and operation of the control apparatus 100 of the mobile robot according to an embodiment of the present disclosure will be described with reference to FIG. 7.

Figure 7:
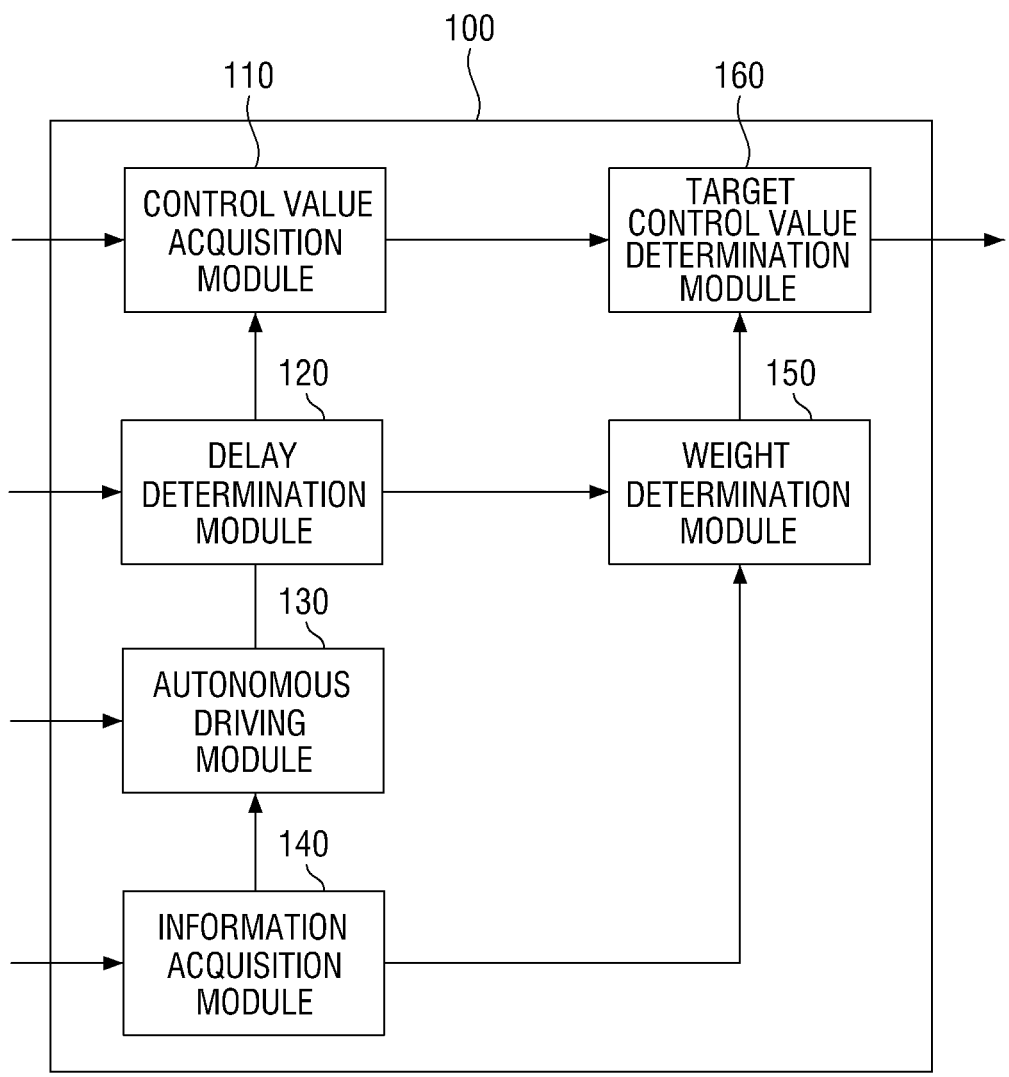
FIG. 7 is an example block diagram showing an apparatus for controlling a mobile robot according to some embodiments of the present disclosure.

FIG. 7 is an example block diagram showing the control apparatus 100 according to some embodiments of the present disclosure.

Referring to FIG. 7, the control apparatus 100 may be configured to include a control value acquisition module 110, a delay determination module 120, an autonomous driving module 130, an information acquisition module 140, a weight determination module 150, and a target control value determination module 160. However, only elements related to the embodiment of the present disclosure are shown in FIG. 7. Accordingly, it is to be understood by those skilled in the art that general-purpose elements other than the elements shown in FIG. 7 may be further included. Each element will be described below.

The control value acquisition module 110 acquires various kinds of control values serving as the basis of the target control value. In detail, the control value acquisition module 110 may acquire a remote control value input by a user from the remote control system 20 and may acquire an autonomous control value generated by the autonomous driving module 130. Each of the remote control value and the autonomous control value may include control values for a speed, a steering angle, and the like of the mobile robot 30.

Also, the control value acquisition module 110 may further acquire, from the server 50, a pattern control value obtained based on a driving pattern of a corresponding user, a pattern control value obtained based on an average driving pattern of a plurality of users, and the like.

Figure 1:
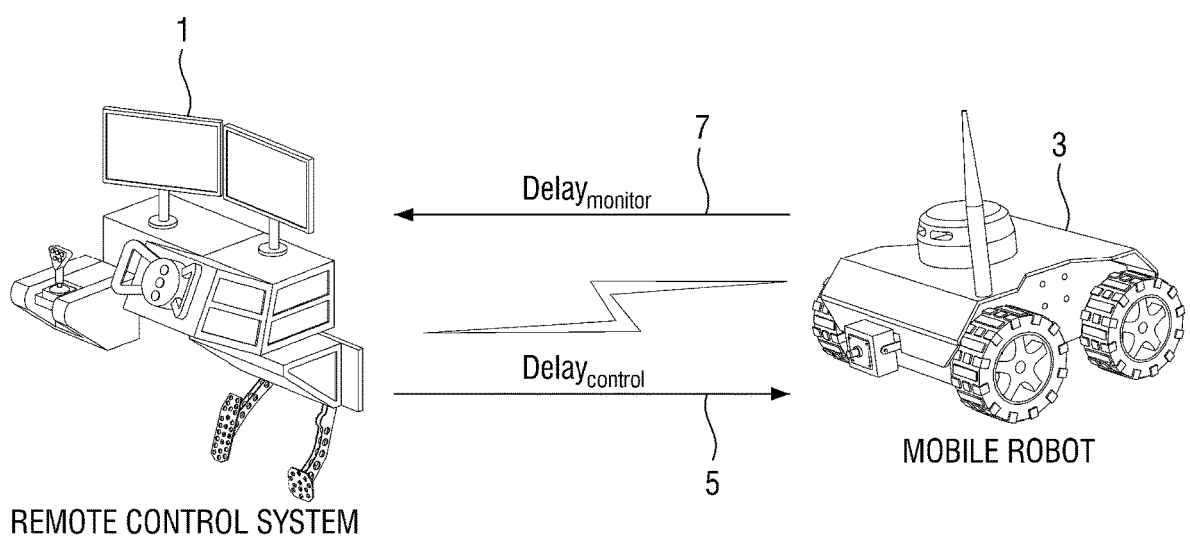
FIG. 1 is a diagram illustrating a communication delay between a remote control system and a mobile robot.

Subsequently, the delay determination module 120 determines a communication delay between the remote control system 20 and the mobile robot 30. The communication delay may be determined based on the control delay 5 and the monitoring delay 7 as shown in FIG. 1. For example, the communication delay may be determined in various forms such as the sum, the average, and the weighted average of the two delays 5 and 7.

Subsequently, the autonomous driving module 130 generates an autonomous control value for the mobile robot 30. To this end, the autonomous driving module 130 may use at least one autonomous driving algorithm well-known in the art, and any autonomous algorithm may be used.

Subsequently, the information acquisition module 140 acquires various kinds of information such as a risk of collision with an object near the mobile robot 30, a level of complexity of surrounding environments, etc. The risk of collision and the level of complexity may be used by the weight determination module 150 to determine a weight for each control value.

The information acquisition module 140 may directly calculate the risk of collision and the level of complexity and may receive information calculated by another apparatus. This may depend on the embodiment. A method in which the information acquisition module 140 determines a level of complexity and a risk of collision with a nearby object based on sensing data of the mobile robot will be described with reference to FIG. 12.

Subsequently, the weight determination module 150 determines a weight for each control value and provides the determined weight to the target control value determination module 160. In this case, the weight may be understood as a value indicating the proportion in which each control value is reflected in the target control value.

In some embodiments, the weight determination module 150 may determine a weight for each control value based on a communication delay provided by the delay determination module 120. A detailed description of this embodiment will be described in detail with reference to FIGS. 10 and 11.

In some embodiments, the weight determination module 150 may determine a weight for each control value in further consideration of the risk of collision with an object near the mobile robot 30, the risk of collision being provided by the information acquisition module 140. A detailed description of this embodiment will be described below with reference to FIG. 12.

In some embodiments, the weight determination module 150 may determine a weight for each control value in further consideration of the level of complexity of surrounding environments of a mobile robot 30, the level of complexity being provided by the information acquisition module 140. A detailed description of this embodiment will be described below with reference to FIG. 12.

Subsequently, the target control value determination module 160 determines a target control value based on a plurality of control values provided by the control value acquisition module 110 and a weight for each control value provided by the weight determination module 150.

For example, the target control value determination module 160 may determine the target control value based on the weighted average of the plurality of control values. However, this is merely illustrative of some embodiments of the present disclosure, and the technical scope of the present disclosure is not limited thereto.

It should be noted that not all elements shown in FIG. 7 are essential elements of the control apparatus 100. That is, according to another embodiment of the present disclosure, the control apparatus 100 may be implemented with some of the elements shown in FIG. 7.

Each of the elements 110 to 160 shown in FIG. 7 may denote software or hardware such as a field programmable gate array (FPGA) or an application specific integrated circuit (ASIC). However, the elements are not limited to software or hardware, and may be configured to be in an addressable storage medium or configured to activate one or more processors. Functions provided by the elements may be implemented with sub-elements and may be implemented with one element that performs a specific function by combining the plurality of elements.

The configuration and operation of the control apparatus 100 according to some embodiments of the present disclosure have been described with reference to FIG. 7. The control method for the mobile robot according to some embodiments of the present disclosure will be described below in detail below with reference to FIGS. 8 to 12.

Each step of the control method for the mobile robot according to some embodiments of the present disclosure, which will be described below, may be performed by a computing apparatus. That is, each step of the control method may be implemented with one or more instructions executed by a processor of the computing apparatus. All the steps of the control method may be executed by a single physical computing apparatus. However, first steps of the method may be performed by a first computing apparatus, and second steps of the method may be performed by a second computing apparatus. The following description assumes that each step of the control method is performed by the control apparatus 100. However, for convenience, the description of the operating subject of each step included in the control method may be omitted.

Figure 8:
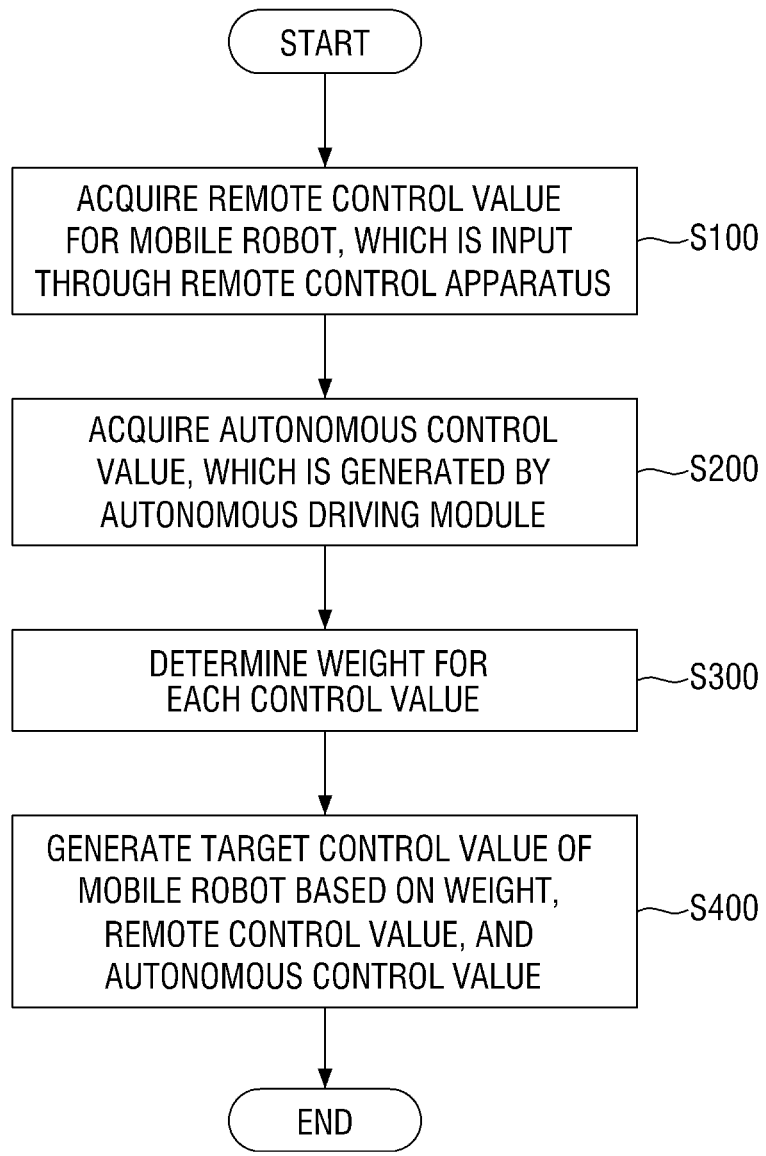
FIG. 8 is an example flowchart showing a method of controlling a mobile robot according to a first embodiment of the present disclosure.

FIG. 8 is an example flowchart showing a control method for a mobile robot according to a first embodiment of the present disclosure. However, it should be appreciated that this is merely an example embodiment for achieving the objects of the present disclosure and some steps are added to, or deleted from, the configuration as needed.

Referring to FIG. 8, the control method for the mobile robot according to the first embodiment begins with step S100 in which the control apparatus 100 acquires a remote control value that is input through the remote control system 20. In this case, the remote control value may include control values for a speed, a steering angle, and the like of the mobile robot 30.

In step S200, the control apparatus 100 acquires an autonomous control value generated by the autonomous driving module. The autonomous control value may also include control values for a speed, a steering angle, and the like of the mobile robot 30.

In step S300, the control apparatus 100 determines a weight for each control value.

In some embodiments, the control apparatus 100 may determine a weight for each control value based on a communication delay between the remote control system 20 and the mobile robot 30. A detailed example of this embodiment is shown in FIG. 9.

Figure 9:
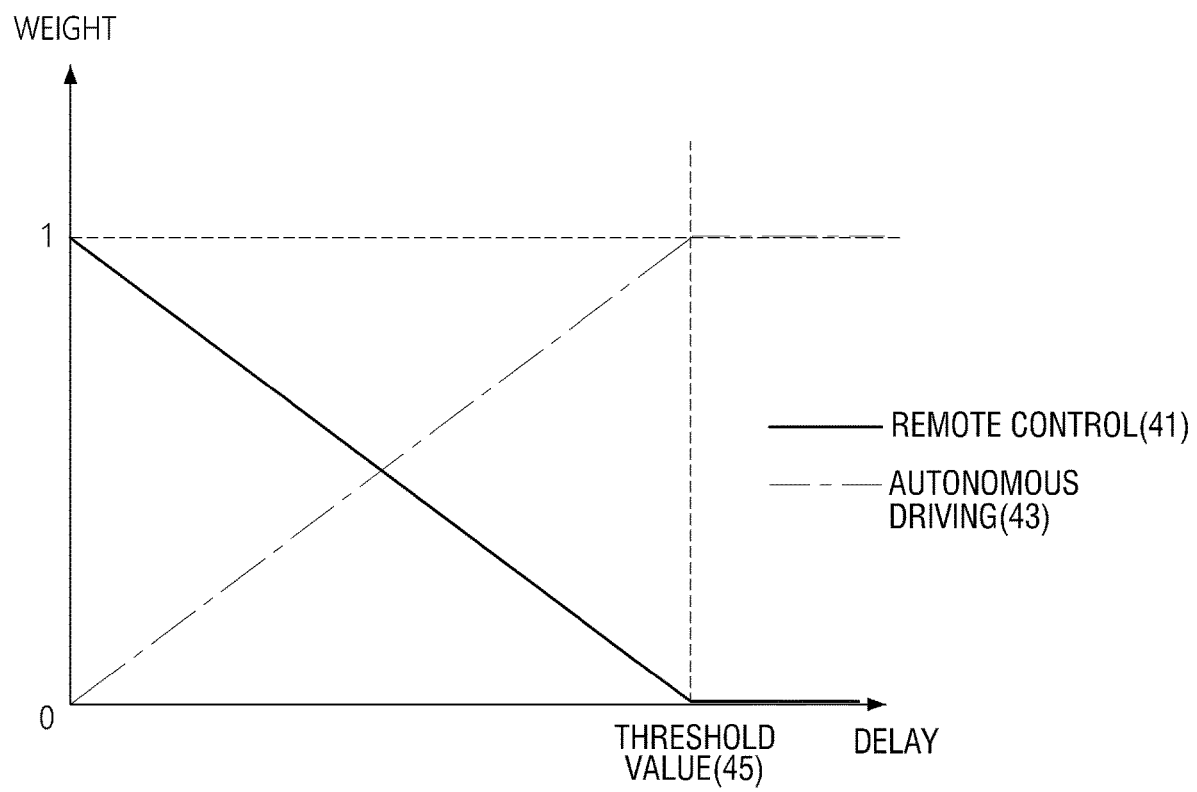
FIGS. 9 and 10 are diagrams illustrating a weight for each control value to be referenced according to some embodiments of the present disclosure.

As shown in FIG. 9, a weight 41 for a remote control value (hereinafter referred to as a "remote weight") and a weight 43 for an autonomous control value (hereinafter referred to as an "autonomous weight") may be determined as values that are inversely proportional to each other. In detail, as the communication delay increases, the remote weight 41 may be determined as a larger value, and the autonomous weight 43 may be determined as a smaller value. This is to improve the safety of the mobile robot 30 by increasing the proportion in which the autonomous control value is reflected in the target control value as the communication delay increases.

Also, the control apparatus 100 may determine the autonomous weight 43 as the maximum value and determine the remote weight 41 as the minimum value in response to determination that the communication delay is greater than or equal to a predetermined threshold value 45. For example, as shown in FIG. 9, when the weight for each control value has a value from 0 to 1, the control apparatus 100 may determine the autonomous weight 43 to be "1" and may determine the remote weight 41 to be "0." In this case, the mobile robot 30 may be controlled as if it is operating in an autonomous driving mode.

Figure 10:
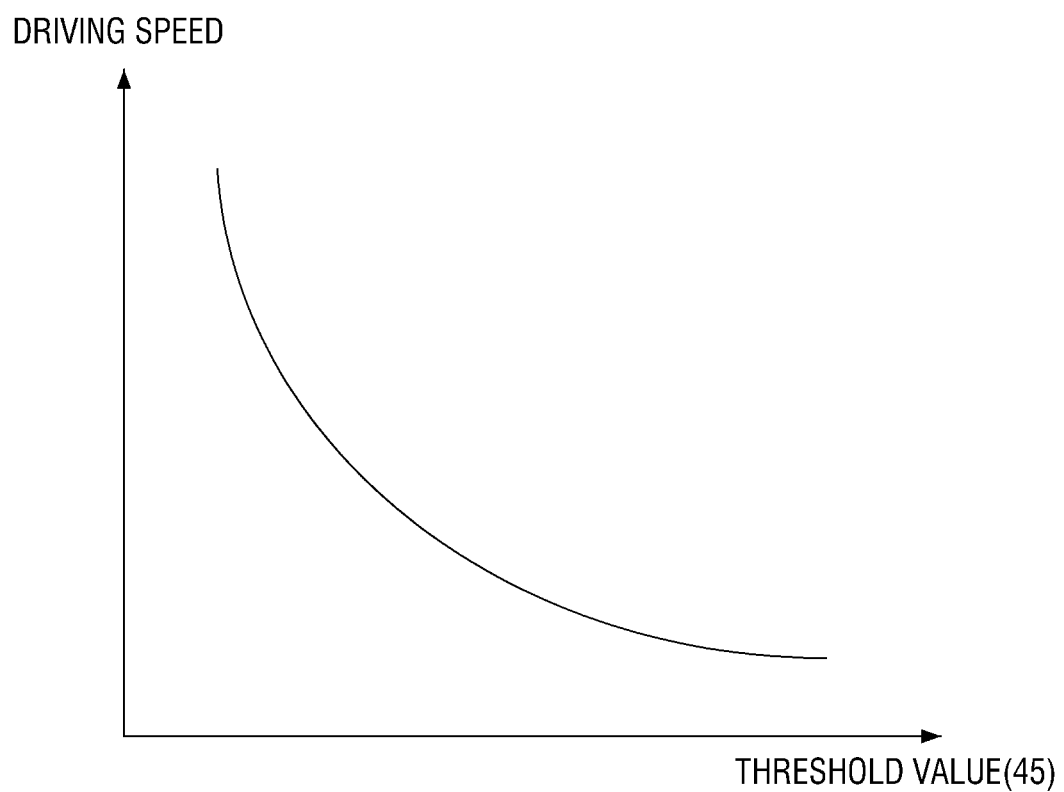

The threshold value 45 may be a predetermined constant or a variable varying depending on situations. For example, the threshold value 45 may be a variable varying according to a current traveling speed of the mobile robot 30. In detail, for example, the threshold value 45 may be determined to be a value that is inversely proportional to the current traveling speed of the mobile robot 30, as shown in FIG. 10, and may vary as the current traveling speed of the mobile robot 30 changes. In this case, when the current traveling speed of the mobile robot 30 is higher even through the communication delay is maintained, the control apparatus 100 determines the autonomous weight 43 to be a lager value. Accordingly, it is possible to further decrease the risk of accident of the mobile robot 30 and to improve safety. However, this is merely illustrative of some embodiments of the present disclosure, and the technical scope of the present disclosure is not limited thereto.

Figure 11:
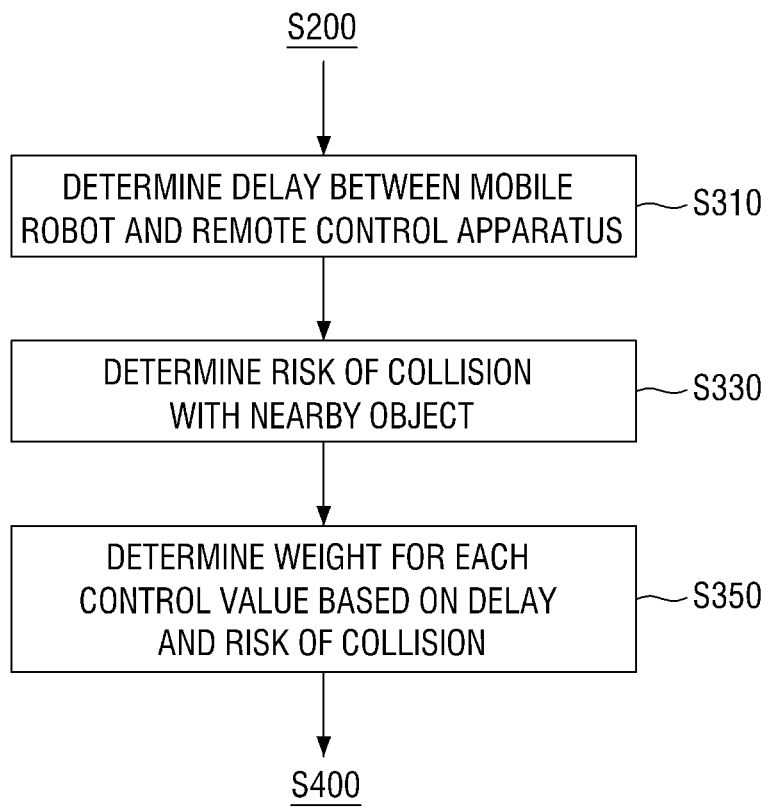
FIG. 11 is an example flowchart showing a weight determination process according to some embodiments of the present disclosure.

In some embodiments, as shown in FIG. 11, the control apparatus 100 may determine a weight for each control value in further consideration of a risk of collision with an object near the mobile robot 30 (S310, S330, and S350). For example, in order to improve the safety of the mobile robot 30, the control apparatus 100 may determine the autonomous weight to be a larger value as the risk of collision increases.

The risk of collision may be determined based on sensing data of the mobile robot 30. In this case, the sensing data may include data measured by various kinds of sensors, for example, data regarding a distance from a nearby object which is measured through a proximity sensor and data regarding an image which is captured by a camera sensor.

According to some embodiments of the present disclosure, the control apparatus 100 may determine the risk of collision based on an image analysis result such as the number of nearby objects, the result of recognizing a nearby object, a distance from the nearby object, and the characteristics (or features) of surrounding environments (e.g., a flat road, an uphill road, a downhill road, the presence of lanes, the size of lanes, the presence of intersections, the presence of traffic lights, etc.), which are obtained from the image data. In this case, the result of recognition may include information regarding whether the nearby object is a mobile object or a stationery object, whether the nearby object is a person or thing, and the like and information regarding the size, material, and the like of the corresponding object.

The method in which the control apparatus 100 determines the risk of collision with the nearby object may vary depending on the embodiment. For example, the risk of collision may be determined to be a higher value as the number of nearby objects located within a certain distance increases. As another example, the risk of collision may be determined to be a higher value as the number of nearby objects corresponding to mobile objects within a certain distance increases. As still another example, the risk of collision may be determined to be a higher value as the number of nearby objects corresponding to persons within a certain distance increases. This is because a person is likely to show a more irregular movement pattern than a thing. As still another example, when a plurality of nearby objects are located within a certain distance, but most of the corresponding nearby objects are located in other lanes, the risk of collision may be determined to be a lower value. As still another example, the risk of collision may be determined to be a higher value as the level of complexity of surrounding environments increases. As still another example, the risk of collision may be determined to be a higher value as the size of the nearby object and the hardness of the material of the nearby object increase.

Figure 12:
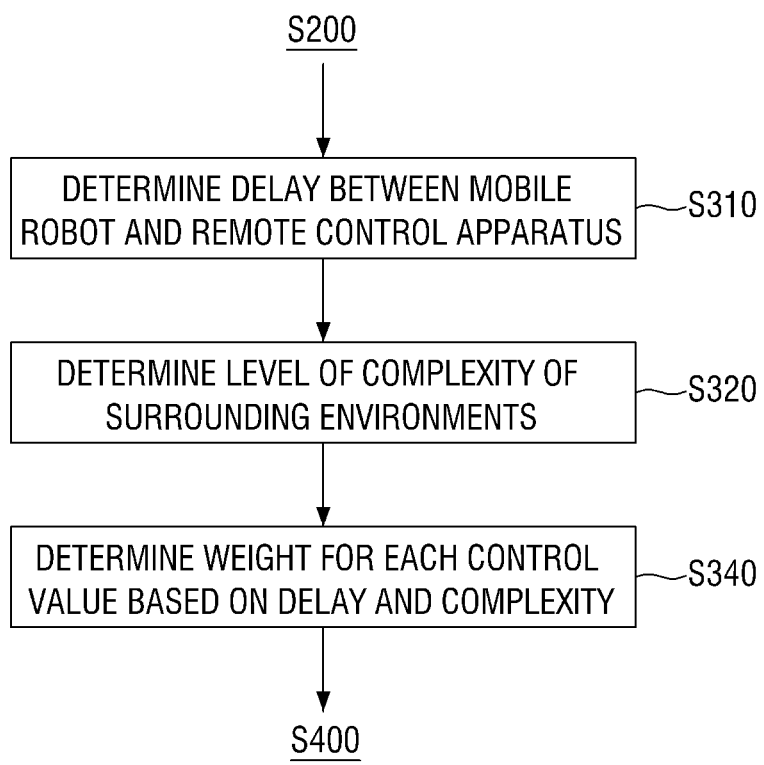
FIG. 12 is an example flowchart showing a weight determination process according to other embodiments of the present disclosure.

In some embodiments, as shown in FIG. 12, the control apparatus 100 may determine a weight for each control value in further consideration of a level of collision of surrounding environments of the mobile robot 30 (S310, S320, and S330).

The level of complexity may also be determined based on sensing data of the mobile robot 30. In this case, the sensing data may include data measured by various kinds of sensors, for example, data regarding a distance from a nearby object which is measured through a proximity sensor and data regarding an image which is captured by a camera sensor.

According to some embodiments of the present disclosure, the control apparatus 100 may determine the level of complexity based on an image analysis result such as the number of nearby objects, the result of recognizing a nearby object, a distance from the nearby object, and the characteristics of surrounding environments (e.g., the presence of lanes, the presence of intersections, the size of lanes, the presence of traffic lights, etc.), a location distribution of the nearby objects, and a density of the nearby objects, which are obtained from the image data. For example, as the number of nearby objects increases, the level of complexity may be determined to be a higher value. As another example, as the number of mobile objects increases, the level of complexity may be determined to be a higher value. As still another example, as the number of mobile objects showing irregular movement patterns increases, the level of complexity may be determined to be a higher value. As still another example, as the number of types of nearby objects increases, the level of complexity may be determined to be a higher value. In addition, the level of complexity may be determined to be a higher value when the surrounding environments indicate that there is an intersection, that a lane is small, or that there is no lane or when a plurality of nearby objects are distributed within a certain distance.

In addition, the control apparatus 100 may determine a weight for each control value through various combinations of the aforementioned embodiments.

Referring to FIG. 8 again, in step S400, the control apparatus 100 generates a target control value of the mobile robot based on a remote control value, an autonomous control value, and a weight for each control value. For example, the control apparatus 100 may generate the target control value using a technique such as a weight sum, a weighted average, and the like.

In some embodiments, the control apparatus 100 may further perform a step of adjusting the target control value so that a difference between the target control value and the remote control value is smaller than or equal to a predetermined threshold value. For example, the control apparatus 100 may adjust the target control value to be within the threshold value in response to determination that the difference between the target control value and the remote control value in step S400 is greater than or equal to the threshold value.

In this case, the threshold value may be a predetermined constant or a variable varying depending on situations. For example, the threshold value may be a variable that is determined to be a larger value as the current traveling speed or the communication delay of the mobile robot 30 increases. This is because the weight for the remote control value may decrease as the current traveling speed or the communication delay increases. According to this embodiment, the target control value may be suitably adjusted so that the difference between the target control value and the remote control value does not increase excessively. Thus, it is possible to further decrease a user's sense of difference in remote operation.

The control method for the mobile robot according to the first embodiment of the present disclosure has been described with reference to FIGS. 8 to 12. According to the above-described method, the target control value is generated based on a combination of the control values. Thus, it is possible to alleviate a problem of the operation of the mobile robot being unstable due to iterative control mode changes and a problem of an operator's sense of difference in operation being maximized. Furthermore, by adjusting a weight for each control value, it is possible to minimize the risk of accident of the mobile robot even without the control mode switching.

The control method for the mobile robot according to the second embodiment of the present disclosure will be described with reference to FIGS. 13 to 15. In order to exclude redundant description, the following description focuses on a difference from the aforementioned first embodiment. However, it will be appreciated that the contents mentioned in the first embodiment may be applied to the second embodiment.

Figure 13:
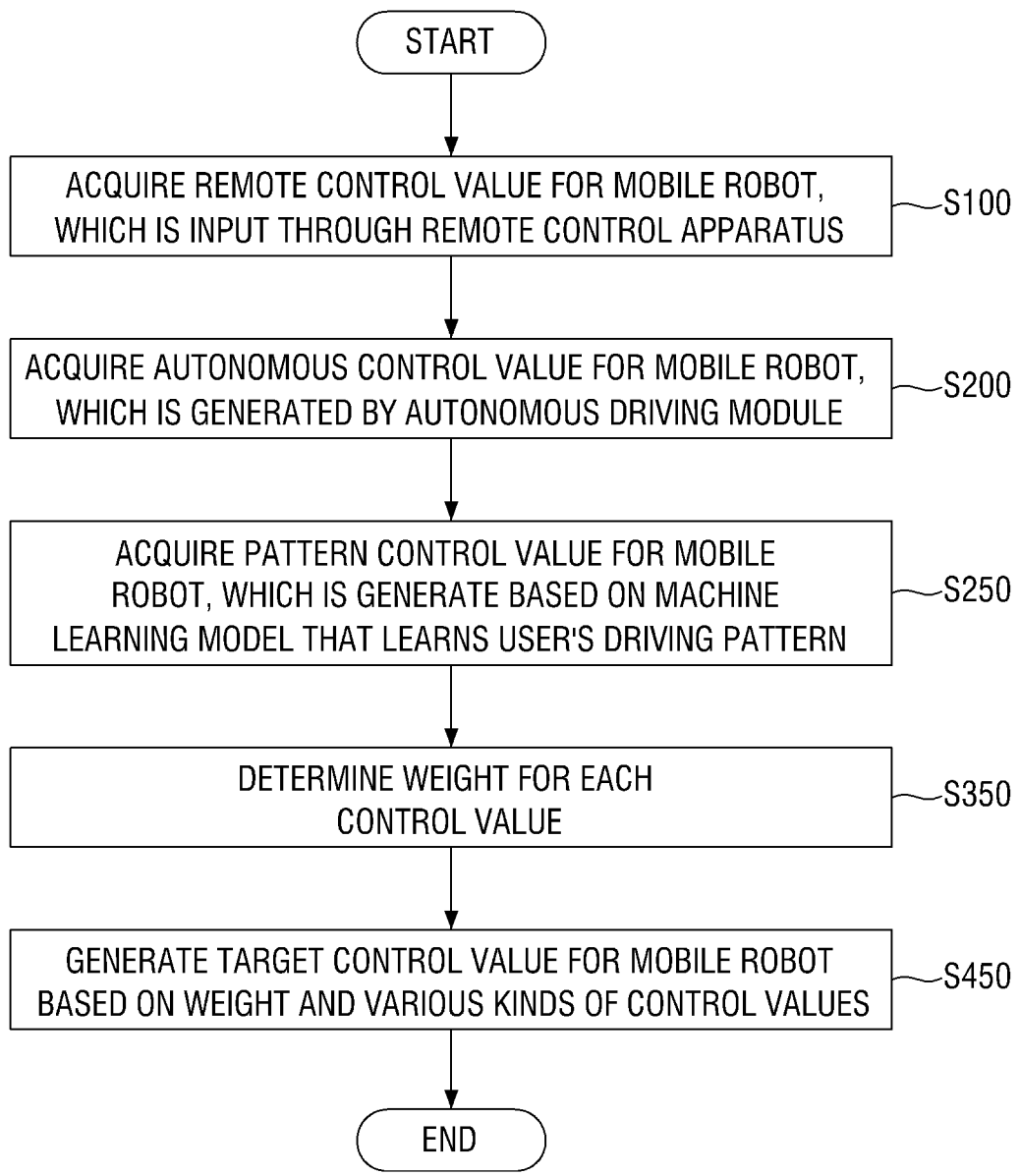
FIG. 13 is an example flowchart showing a method of controlling a mobile robot according to a second embodiment of the present disclosure.

FIG. 13 is an example flowchart showing a control method for a mobile robot according to the second embodiment of the present disclosure. However, it should be appreciated that this is merely an example embodiment for achieving the objects of the present disclosure and some steps are added to, or deleted from, the configuration as needed.

Referring to FIG. 13, like the first embodiment, the control method according to the second embodiment begins with steps in which the control apparatus 100 acquires a remote control value and an autonomous control value (S100, S200).

In step S250, the control apparatus 100 acquires a pattern control value for the mobile robot 30. As described above, the pattern control value refers to a control value generated by a machine learning model that learns a user's driving pattern. That is, the pattern control value refers to a control value that is predicted for the current surrounding environment of the mobile robot 30 based on past driving patterns. A method of learning a driving pattern will be described below with reference to FIGS. 14 and 15.

The pattern control value may include a first pattern control value generated based on a driving pattern of a specific user who controls the mobile robot 30 through the remote control system 20 and/or a second pattern control value generated based on an average driving pattern of a plurality of users. The pattern control value may be received, for example, from a predetermined server (e.g., the server 50), but the technical scope of the present disclosure is not limited thereto.

In step S350, the control apparatus 100 determines a weight for each control value. For example, the weight for the pattern control value may be determined to be a larger value as the communication delay or the current traveling speed of the mobile robot 30 increases.

In step S450, the control apparatus 100 generates a target control value of the mobile robot 30 based on a remote control value, an autonomous control value, a pattern control value, and a weight for each control value. For example, the control apparatus 100 may generate the target control value using a technique such as a weight sum, a weighted average, and the like.

The control method for the mobile robot according to the second embodiment of the present disclosure has been described with reference to FIG. 13. According to the above-described method, the target control value is generated in further consideration of a pattern control value generated based on a driving pattern of a corresponding operator or driving patterns of a plurality of operators. When the pattern control value corresponding to the driving pattern of the corresponding operator is reflected in the target control value, it is possible to alleviate an operator's sense of difference in operation. Also, when the pattern control value corresponding to the driving patterns of the plurality of operators is reflected in the target control value, an error of another control value may be corrected by the pattern control value, and thus it is possible to further improve the safety of the mobile robot.

The driving pattern learning method according to some embodiments of the present disclosure will be described below with reference to FIGS. 14 and 15. Each step of the driving pattern learning method to be described below may be performed by a computing apparatus. For example, the computing apparatus may be a server 50, a control apparatus 100, a remote control system 20, a mobile robot 30, or the like. However, in order to facilitate understanding, the following description assumes that the operating subject of each step included in the driving pattern learning method is the server 50. For convenience of description, it will be appreciated that the description of the operating subject of each step may be omitted.

First, learning data used to learn a driving pattern will be described with reference to FIG. 14.

Figure 14:
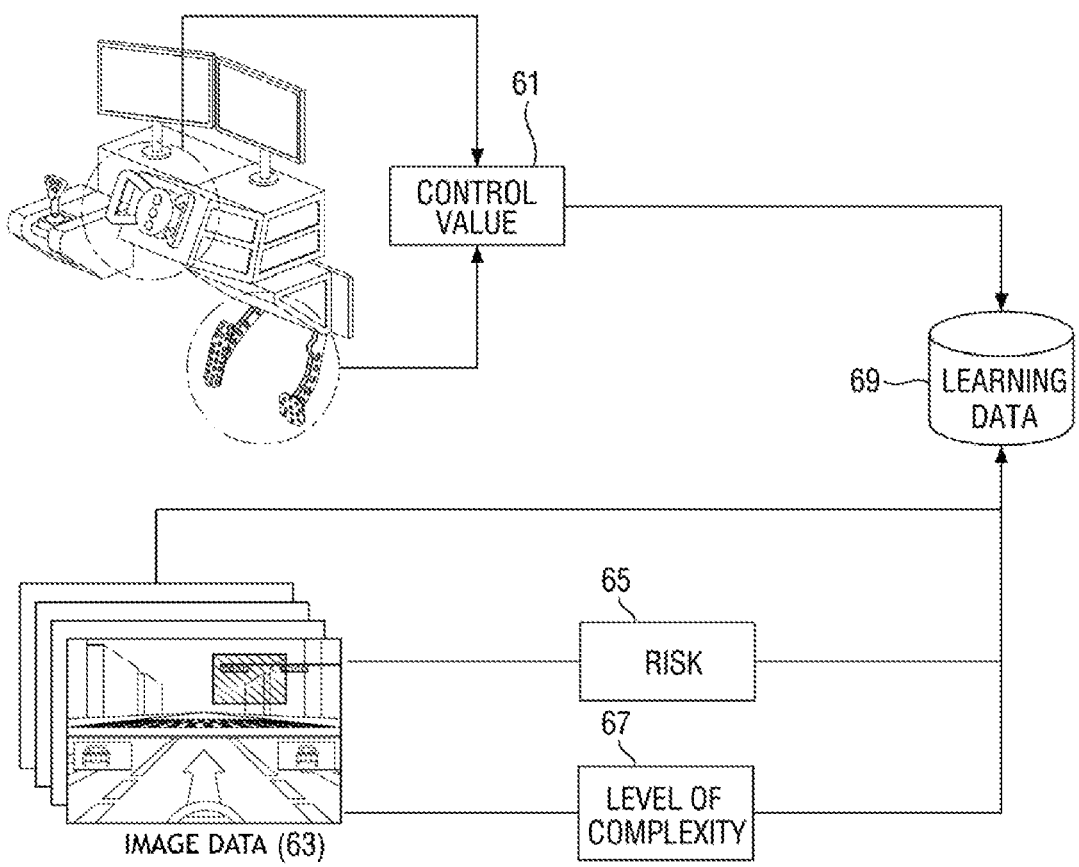
FIGS. 14 and 15 are example diagrams showing a driving pattern learning method according to some embodiment of the present disclosure.
Figure 15:
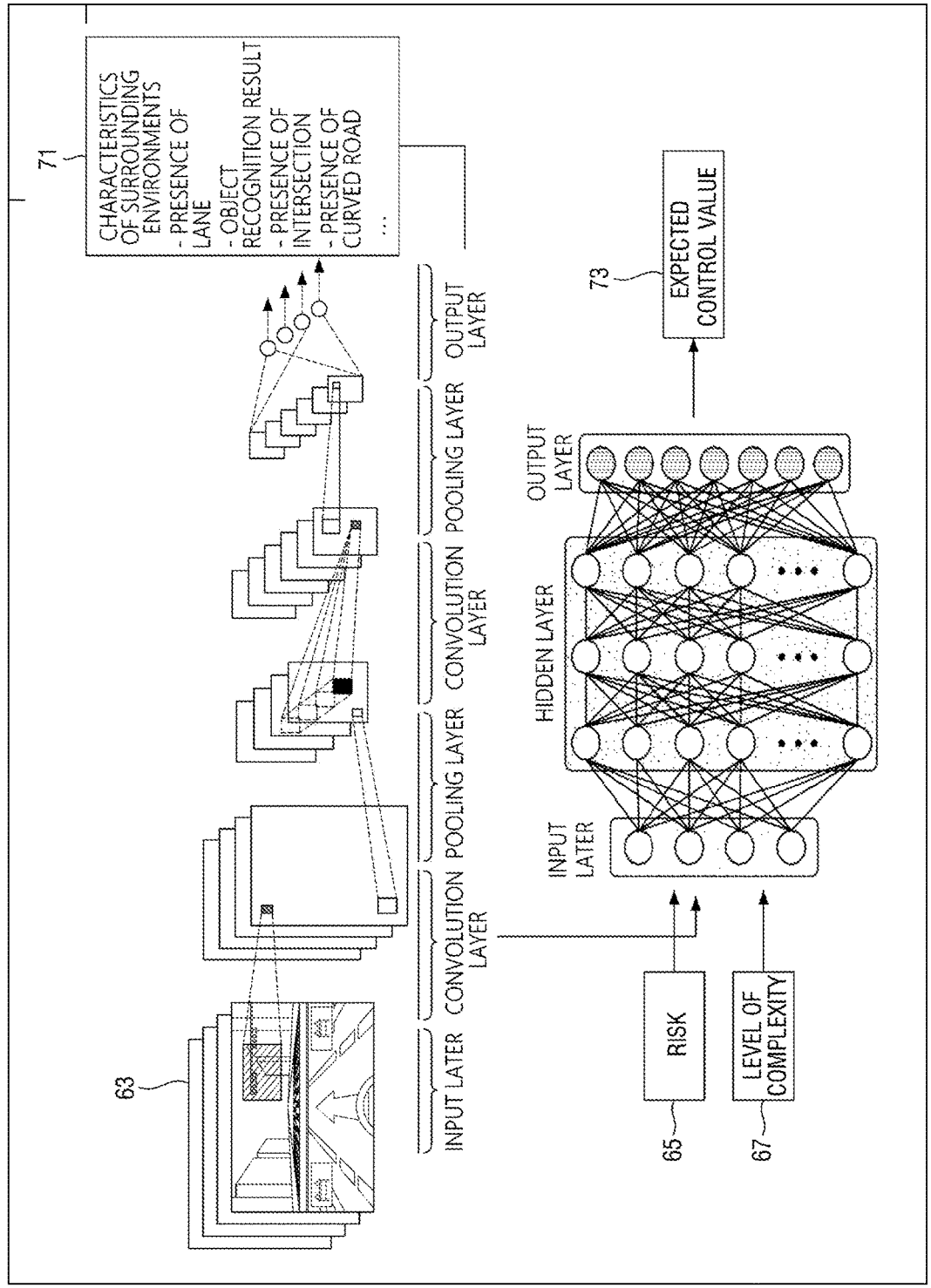

As shown in FIG. 14, learning data 69 may include image data 63 obtained by capturing surrounding environments of the mobile robot 30 and a remote control value corresponding to the surrounding environments Accordingly, when a driving pattern (e.g., a degree of deceleration when an object appears, a degree of deceleration on a curved road, etc.) of a corresponding user is learned through machine learning of the learning data 69, a pattern control value of a corresponding user for a specific surrounding environment may be predicted.

Also, the learning data 69 may further include information regarding a risk of accident 65, a level of complexity 67, and the like, which are calculated based on the image data 63. The method of calculating the risk of accident 65 and the level of complexity 67, and thus redundant description thereof will be omitted.

Subsequently, a machine learning-based driving pattern learning method will be described with reference to FIG. 15.

The driving pattern learning method may include an extraction process in which surrounding environment features 71 are extracted from the image data 63 included in the learning data 69 and a learning process in which machine learning is performed on pieces of learning data 61, 65, and 67 other than the surrounding environment features 71.

The extraction process may be a process of extracting various surrounding environment features 71 through analysis of the image data 63, and the surrounding environment features 71 may include various features such as the presence of lanes, an object recognition result, the presence of intersections, the presence of curved roads, the presence of traffic lights, and the like. FIG. 15 shows an example in which various surrounding environment features 71 are extracted from the image data 63 using a pre-learned convolutional neural network (CNN), but the technical scope of the present disclosure is not limited thereto. For example, the surrounding environment features 71 may be extracted using a computer vision algorithm well-known in the art.

Figure 16:
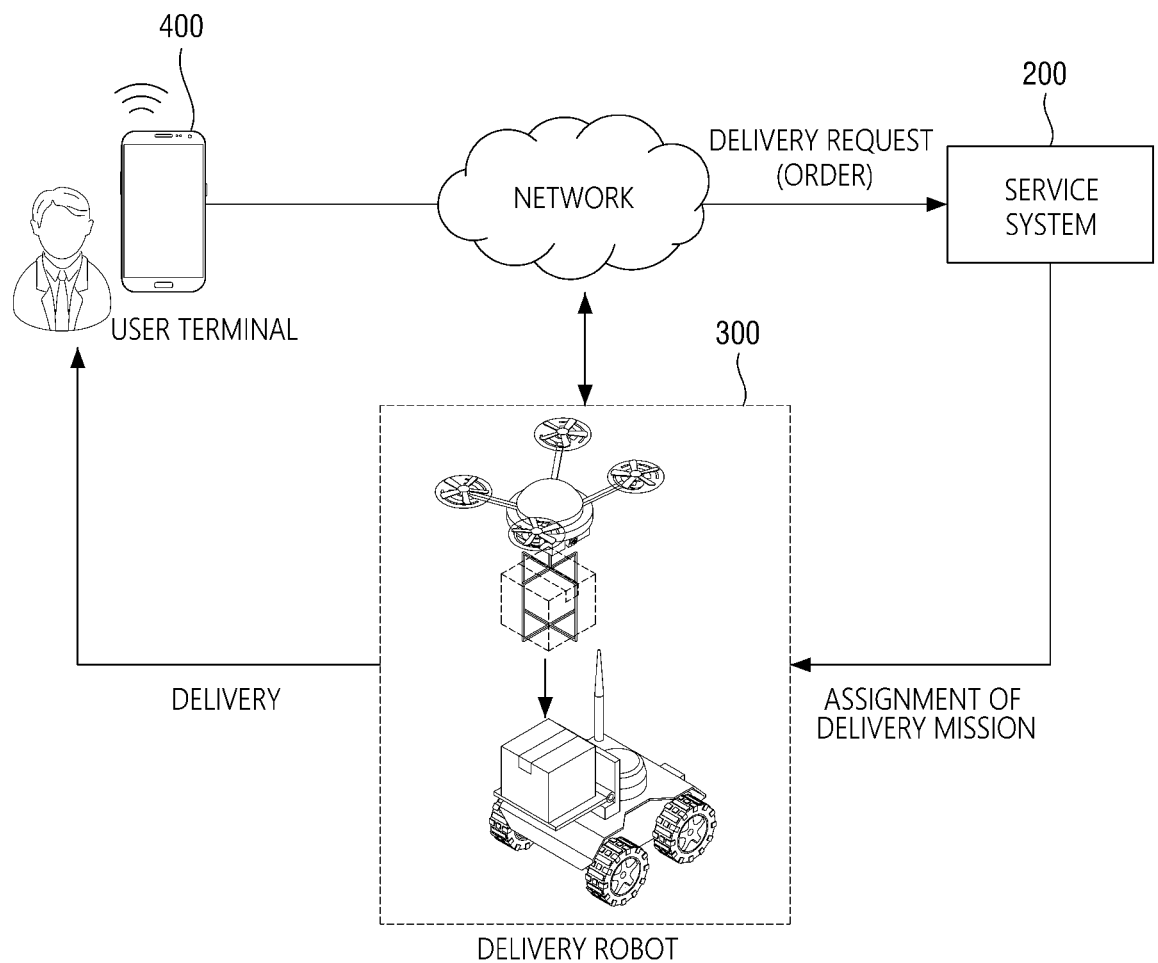
FIG. 16 is a diagram illustrating a delivery system using a mobile robot according to some embodiments of the present disclosure.

The learning process is a process of performing machine learning on the surrounding environment features 71, the risk of collision 65, the level of complexity 67, and the remote control value 61. In this case, the surrounding environment features 71, the risk of collision 65, the level of complexity 67, and the like may be used as input data of the machine learning model, and the remote control value 61 may be used to update weights of the machine learning model through comparison to a predicted control value 73 of an output layer. FIG. 16 shows an example in which machine learning is performed using a deep learning model based on an artificial neural network (ANN), but the technical scope of the present disclosure is not limited thereto. Different types of machine learning algorithms may be used to learn a driving pattern.

The learning of driving patterns of a plurality of users is merely that the learning data is expanded to learning data for the plurality of users, and thus redundant description thereof will be omitted. Depending on the embodiment, it will be appreciated that a plurality of machine learning model that learn driving patterns of individual users may be built and also a single machine learning model that learns driving patterns of a plurality of users may be built. When the plurality of machine learning models are built, a pattern control value for a plurality of users may be determined based on an average, a weighted average, and the like of pattern control values of individual users. In this case, for example, accuracy, learning maturity, and the like of each machine learning model may be used as weights to be used for the weighted average.

The machine-learning-based driving pattern learning method according to some embodiments of the present disclosure has been described with reference to FIGS. 14 and 15.

The robot control system, the control method for the mobile robot, and the control apparatus 100 for supporting the control method have been described with reference to FIGS. 3 to 15. A delivery system using a mobile robot and an operating method for the system according to some embodiments of the present disclosure will be described below with reference to FIG. 16 and subsequent drawings. The aforementioned control concept for the mobile robot may be applied to a mobile robot which will be described below.

FIG. 16 is a diagram illustrating a delivery system using a mobile robot according to some embodiments of the present disclosure.

As shown in FIG. 16, the delivery system may include a service system 200 and a mobile robot responsible for delivery (hereinafter referred to as a "delivery robot 300"). However, it should be appreciated that this is merely an example embodiment for achieving the objects of the present disclosure and some elements are added to, or deleted from, the configuration as needed.

A brief overview of each element will be given. The service system 200 is a computing system for providing a mobile robot-based delivery service to a user. The service system 200 may perform miscellaneous functions such as reception of a delivery request, allocation of a delivery mission according to a delivery request, and monitoring of a delivery status.

Figure 17:
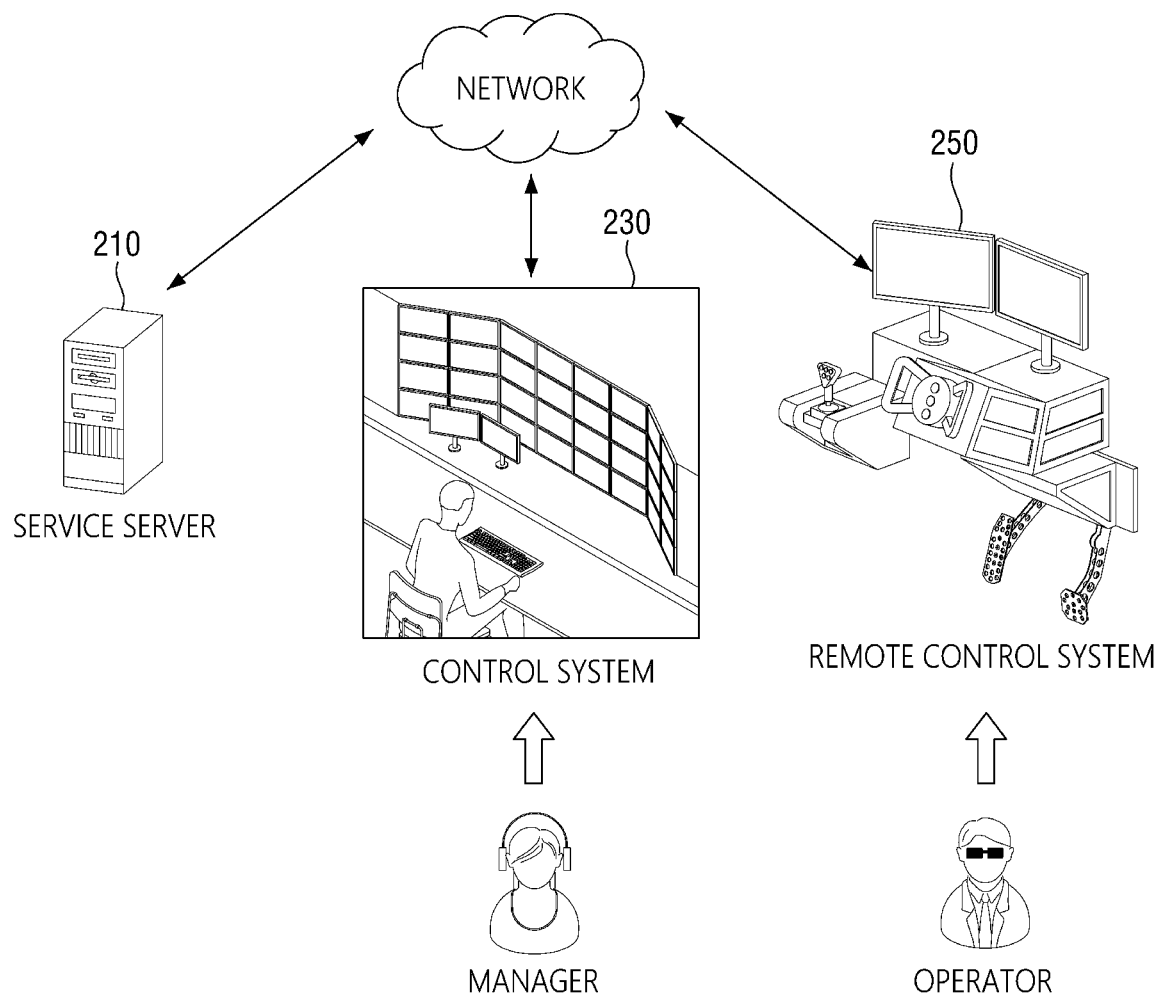
FIG. 17 is an example configuration diagram showing a service system according to some embodiments of the present disclosure.

In some embodiments, as shown in FIG. 17, the service system 200 may include a service server 210, a control system 230, and a remote control system 250.

The service server 210 is a computing apparatus that provides a webpage for a delivery request or that performs all functions associated with the delivery service, for example, management of a delivery history. The service server 210 may receive a delivery request from a user terminal 400 and may request the control system 230 to generate a mission corresponding to the delivery request.

Subsequently, the control system 230 is a system that performs all control functions for the delivery robot 300, such as generation of a delivery mission, allocation of a delivery mission, and monitoring a delivery robot. The control system 230 may perform real-time communication with the delivery robot 300 and performing various kinds of monitoring and control functions. As shown in FIG. 17, the control system 230 may be implemented to include a plurality of displays to monitor a plurality of delivery robots 300.

Subsequently, the remote control system 250 is a system having a remote control function for the delivery robot 300. In some embodiments, through the remote control system 250, an operator may directly control the delivery robot 300 and provide the delivery service. The remote control system 250 has been described with reference to FIG. 3 or the like.

Referring to FIG. 16 again, the delivery robot 300 is a robot that delivers an item to be delivered (hereinafter referred to as a delivery item). The delivery robot 300 may autonomously perform delivery based on mission information and may also perform delivery under the control of the remote control system 250. As described above, it will be appreciated that the delivery robot 300 may be controlled by a combination of an autonomous control value and a remote control value of the remote control system 250.

The mission information includes all information needed by the delivery robot 300 to perform delivery. For example, the mission information may include delivery origin information, delivery start time information, delivery destination information, target arrival time information, collaboration information for performing collaboration between delivery robots, information about a route to a delivery destination, etc., but the technical scope of the present disclosure is not limited thereto.

The collaboration information includes all information needed to perform collaboration. For example, the collaboration information may include information regarding roles (e.g., delivery, peripheral monitoring, etc.) of the delivery robots, information regarding transfer places and transfer methods for items, and the like. The examples of the collaboration information will be additionally described below along with an example in which collaborative delivery is performed.

The delivery robots 300 that perform the collaboration may be configured in various forms. For example, a ground robot and a drone may collaborate to perform delivery, and a plurality of ground robots or a plurality of drones may collaborate to perform delivery.

Subsequently, the user terminal 400 is a terminal that is used by a user to make a delivery request. The user terminal 400 may be implemented with any device.

The delivery system using the mobile robot has been simply described with reference to FIGS. 16 and 17. A mobile robot-based delivery service providing method performed by the delivery system will be described below with reference to FIG. 18.

Figure 18:
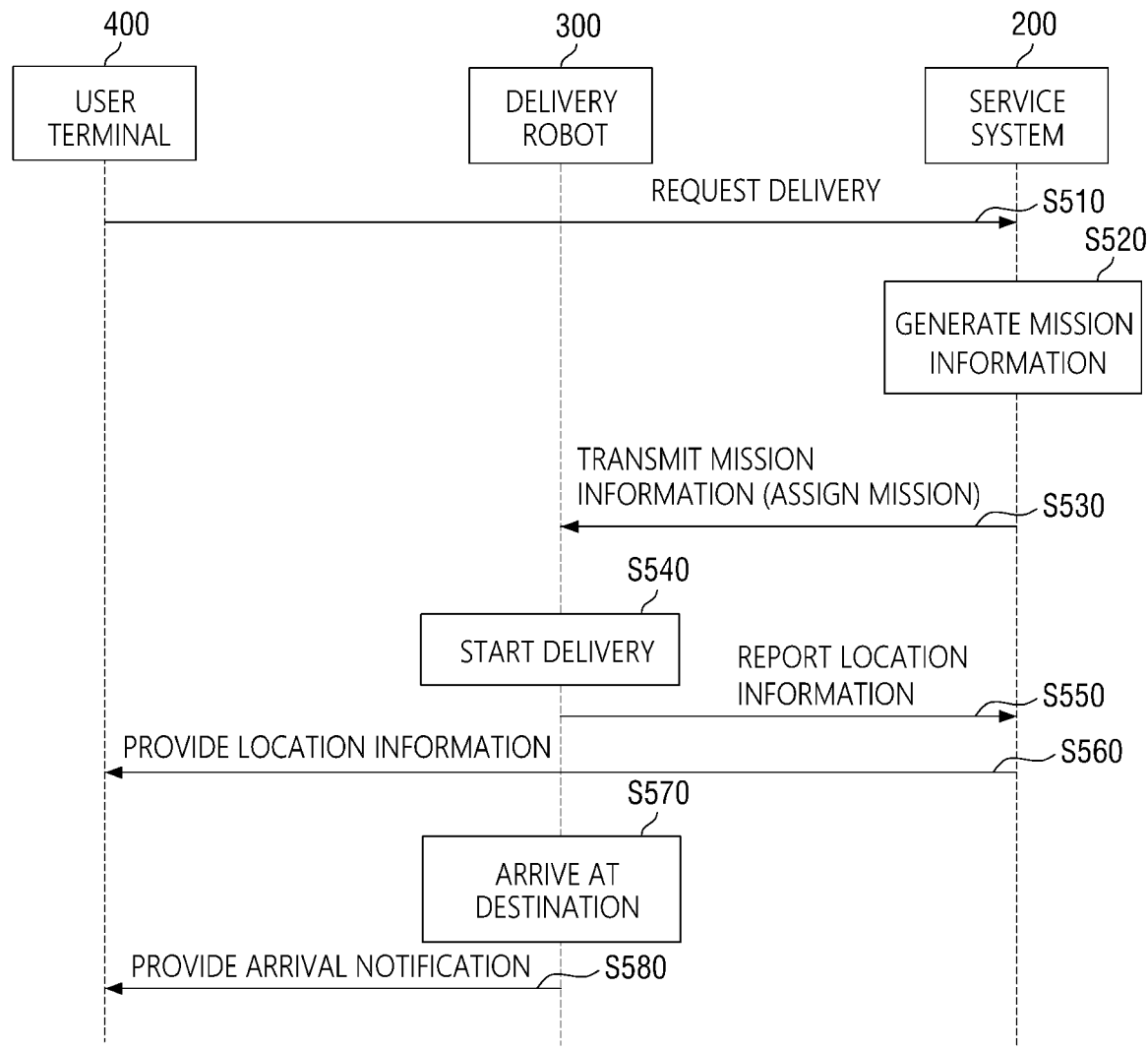
FIG. 18 is an example flowchart showing a mobile robot-based delivery service providing method that may be performed by a delivery system according to some embodiments of the present disclosure.

FIG. 18 is an example flowchart showing a mobile robot-based delivery service providing method performed by a delivery system according to some embodiments of the present disclosure. However, it should be appreciated that this is merely an example embodiment for achieving the objects of the present disclosure and some steps are added to, or deleted from, the configuration as needed.

As shown in FIG. 18, the delivery service providing method begins with step S510 in which a delivery request is received. As described above, the service server 210 may receive the delivery request.

In step S520, the service system 200 generates mission information for delivery in response to the delivery request. As described above, the control system 230 may designate a robot to be responsible for a delivery mission from among a plurality of delivery robots 300 and may generate mission information for the designated robot.

In step S530, the service system 200 transmits the generated mission information to the delivery robot 300 and allocates the delivery mission to the delivery robot 300, In step S540, the delivery robot 300 starts the delivery based on the received mission information. For example, based on a delivery start time and a delivery origin included in the mission information, the delivery robot 300 may move to the delivery origin at the delivery start time and load a delivery item to start the delivery.

In step S550, the delivery robot 300 periodically or aperiodically reports its own location information. Thus, a manager may monitor the location of the mobile robot 300 through the control system 230 in real time.

Also, the delivery robot 300 may report, to the service system 200, information regarding various kinds of events (e.g., item damage, delivery delay, etc.) and information regarding surrounding environments (e.g., images of surrounding environments, information regarding identified obstacles, etc.) which are measured through sensors.

In step S560, the service system 200 provides delivery status information, location information, and the like of the delivery robot 300 to the user terminal 400 in real time. Thus, it is possible to provide a more satisfactory delivery service.

In steps S570 and S580, the delivery robot 300 arrives at a delivery destination according to the received mission information and provides an arrival notification to the user. The movement to the delivery destination may be performed by route information included in the mission information and may also be performed by an autonomous driving function of the delivery robot 300.

The arrival notification may be performed in any manner, including a visual message, such as flashing light, an audible message such as sound and music, a text message, and a phone call.

Figure 19:
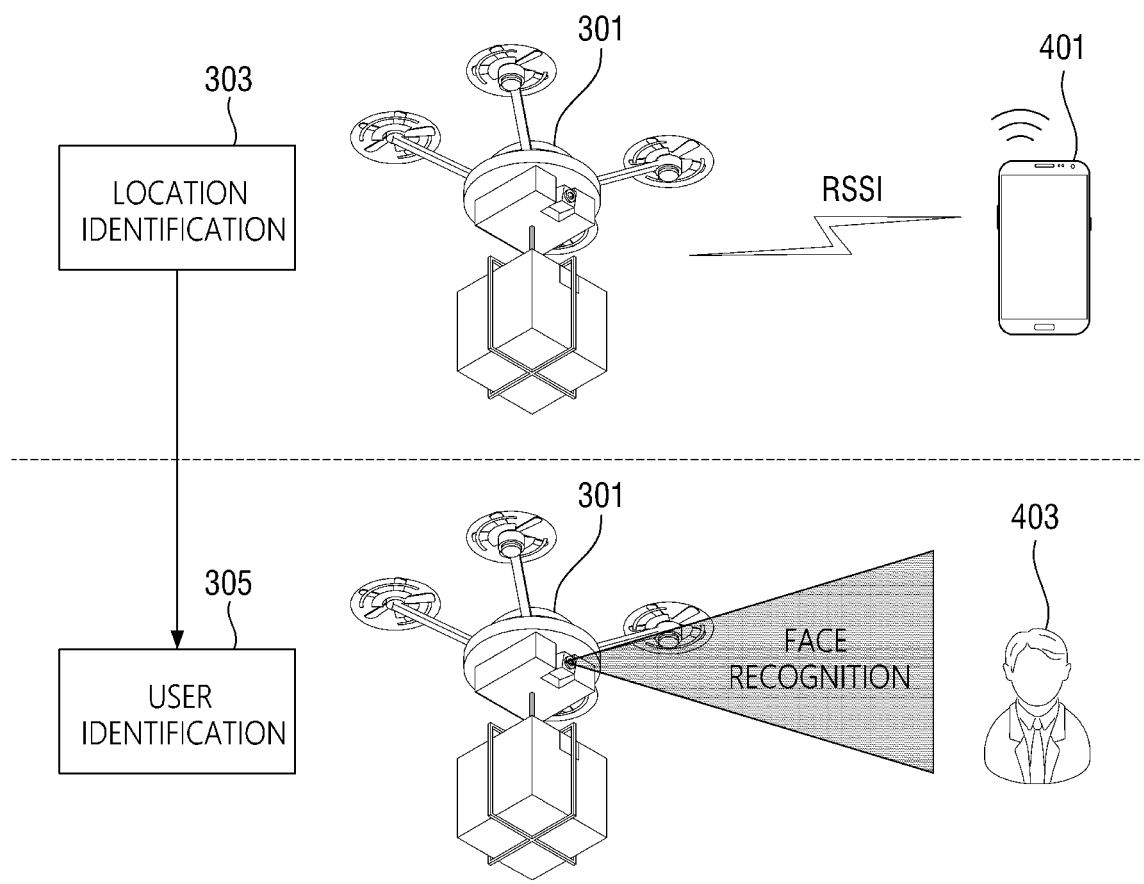
FIG. 19 is an example diagram illustrating a method of identifying a user and a user terminal according to some embodiments of the present disclosure.

In some embodiments, as shown in FIG. 19, the delivery robot 301 may perform a terminal location identification process (303) and a user identification process (305) before performing an arrival notification. In detail, the delivery robot 301 may estimate an approximate location of a user terminal 401 using the strength (e.g. Received Signal Strength Indicator (RSSI)) of signals received from the user terminal 401. Also, in the vicinity of the estimated location, the delivery robot 301 may analyze a captured image and recognize a user 403 by face. Then, the delivery robot 301 may move to the vicinity of the recognized user 403 and provide a delivery notification. Here, an image of the face of the user 403 to be used for face recognition, identification information for identifying the user terminal 401, a scheme for the delivery notification, and the like may be pre-defined in the mission information.

The mobile robot-based delivery service providing method has been described with reference to FIGS. 18 and 19. According to the aforementioned method, by providing a quick and accurate delivery service using a mobile robot, it is possible to improve customer satisfaction and to increase delivery efficiency through reduced labor costs.

According to some embodiments of the present disclosure, the delivery robot 300 includes a ground robot and a drone, and delivery may be performed through collaboration between the ground robot and the drone. Thus, it is possible to provide a door-to-door delivery service or to expand a delivery range. Various embodiments associated with collaborative delivery will be described below with reference to FIGS. 20 to 27.

Figure 20:
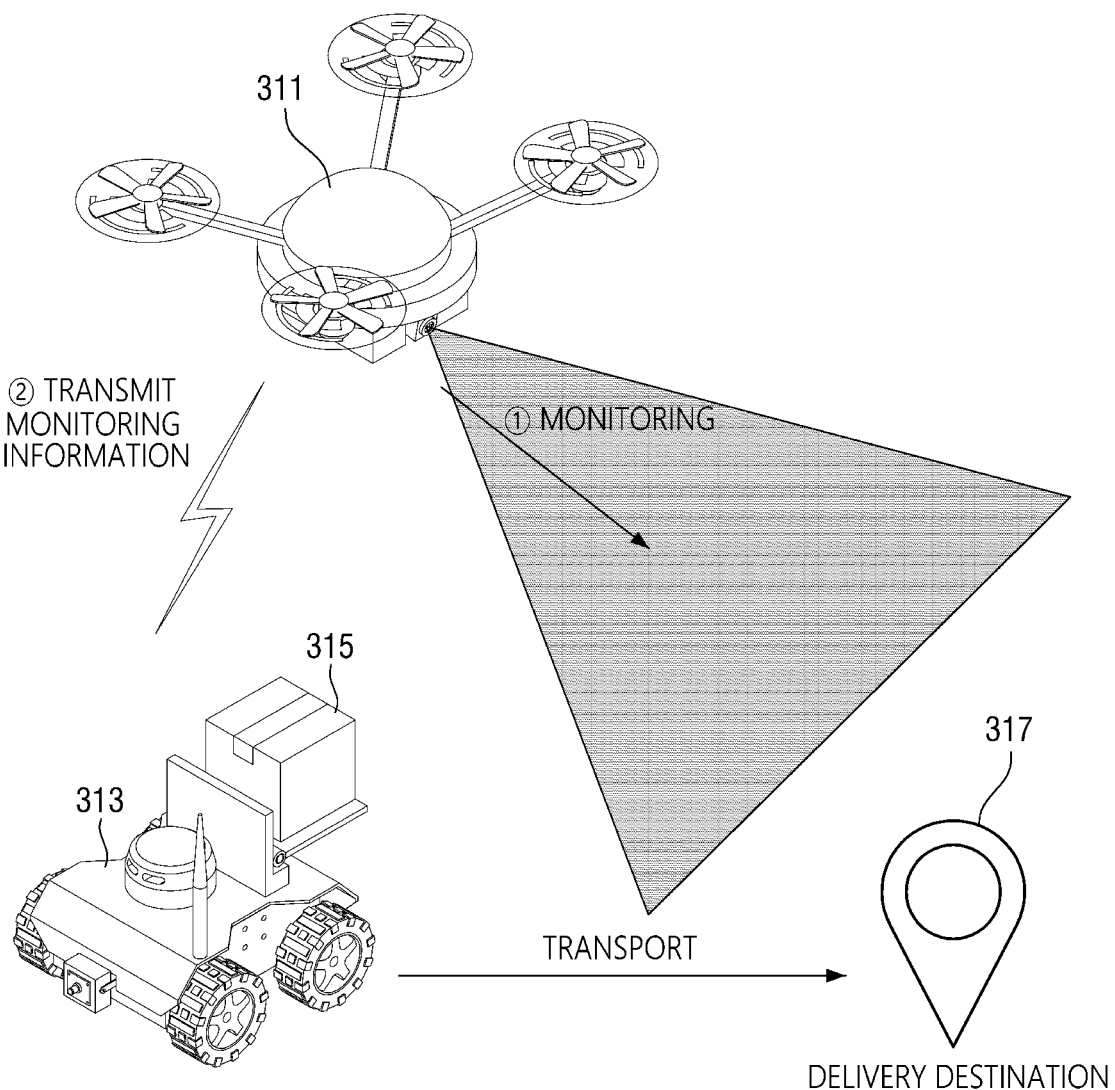
FIG. 20 is an example diagram illustrating a collaborative delivery method according to a first embodiment of the present disclosure.

FIG. 20 is an example diagram illustrating a collaborative delivery method according to a first embodiment of the present disclosure.

As shown in FIG. 20, according to the first embodiment, a drone 311 is responsible for monitoring surrounding environments of a ground robot 313 in the air, and the ground robot 313 is responsible for transporting a delivery item 315. Such role assignment may be defined in collaboration information for the drone 311 and the ground robot 313.

In more detail, the ground robot 313 transports the delivery item 315 to a deliver destination 317, and the drone 311 captures the surrounding environments of the ground robot 313 and provides monitoring information such as obstacle information, topographic information, and traffic information to the ground robot 313. Then, the ground robot 313 may correct a route based on the provided monitoring information. For example, the ground robot 313 may reset the route to be a route for avoiding an obstacle or for maintaining a flat terrain. Thus, it is possible to provide a safer delivery service. As another example, the ground robot 313 may reset the route to be a low traffic route. Thus, it is possible to provide a quick delivery service.

Figure 21:
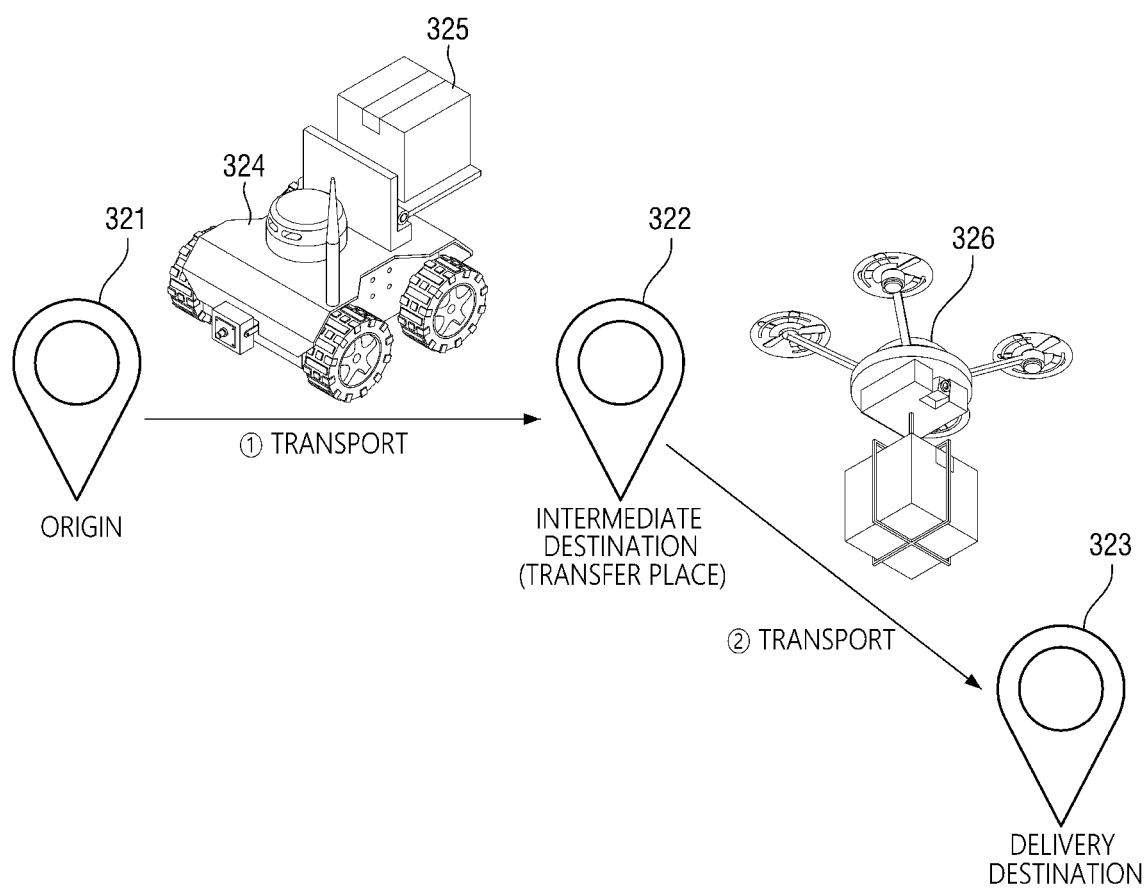
FIG. 21 is an example diagram illustrating a collaborative delivery method according to a second embodiment of the present disclosure.

FIG. 21 is an example diagram illustrating a collaborative delivery method according to a second embodiment of the present disclosure.

As shown in FIG. 21, according to the second embodiment, both of a ground robot 324 and a drone 326 are responsible for transport. For example, the ground robot 324 may be responsible for transporting a delivery item 325 from an origin 321 to an intermediate destination 322, and the drone 326 may be responsible for transporting the delivery item 325 from the intermediate destination 322 to a delivery destination 323. In this case, location information (e.g., a transfer place) of the intermediate destination 322 and information regarding transfer times and the like may be pre-defined in the collaboration information and may be dynamically determined depending on the situation. In order to dynamically perform collaboration, event information (hereinafter referred to as a "collaboration event") causing the collaboration may be defined in the collaboration information.

In some embodiments, the collaboration event may occur when the ground robot 324 or the drone 326 can no longer proceed with the transport. For example, the collaboration event may occur when an abnormality occurs in the robot or when movement to a destination is no longer possible due to an obstacle or the like. In this case, a place where the collaboration event occurs may be regarded as a transfer place (i.e., the intermediate destination 322). An example in which the collaboration event occurs due to an obstacle will be described with reference to FIG. 22.

In some embodiments, the collaboration event may occur based on a risk of accident. The risk of accident will be described below with reference to FIG. 31.

Figure 22:
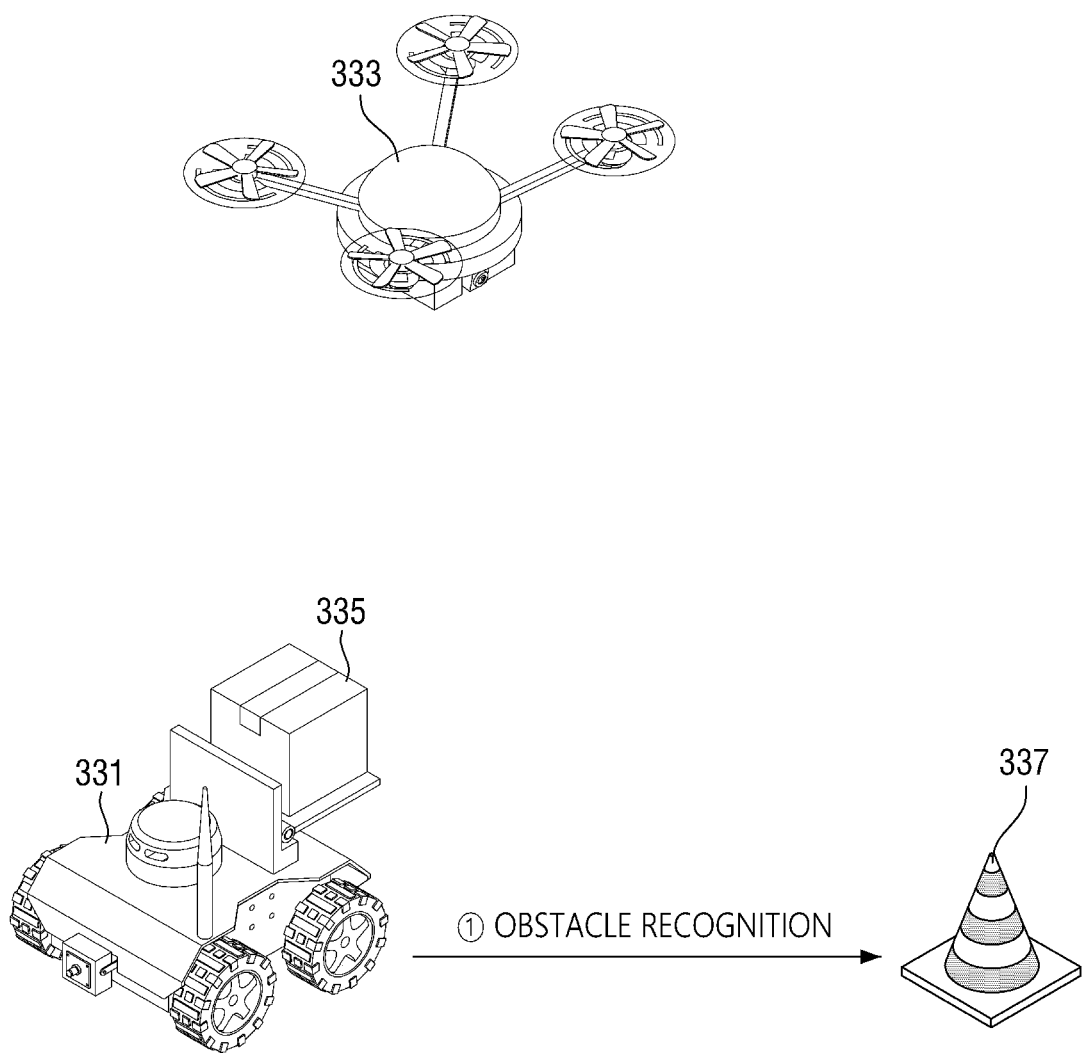
FIGS. 22 and 23 are example diagrams illustrating a collaborative delivery method according to a third embodiment of the present disclosure.
Figure 23:
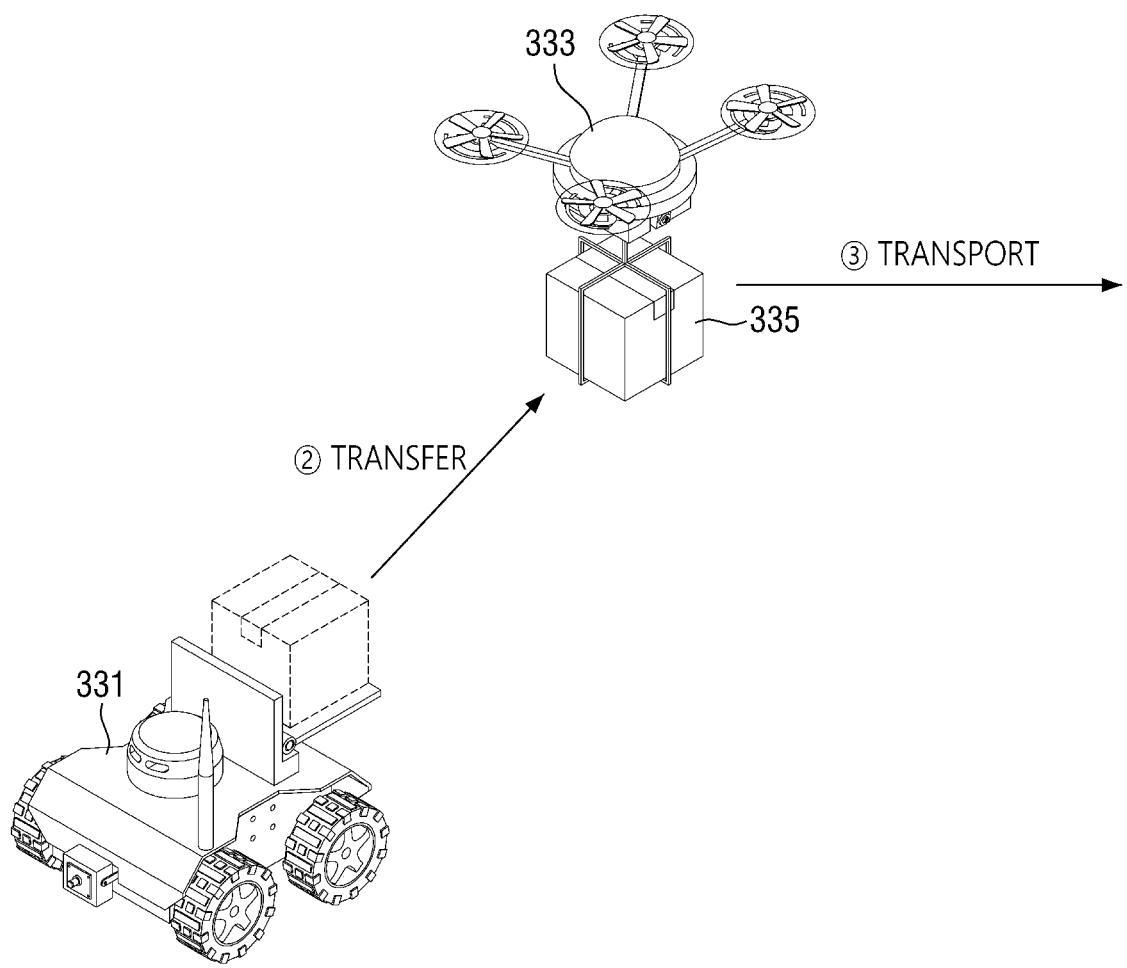

FIGS. 22 and 23 are example diagrams illustrating a collaborative delivery method according to a third embodiment of the present disclosure.

As shown in FIGS. 22 and 23, according to the third embodiment, a ground robot 331 collaborates with a drone 333 in response to recognition of an obstacle 337 present on a route. Like the aforementioned first embodiment, it will be appreciated that the drone may detect or identify the obstacle 337 and provide information regarding the obstacle 337 to the ground robot 331.

In this embodiment, the ground robot 331 may determine whether to bypass the obstacle 337 based on the information regarding the obstacle 337. Here, the obstacle bypassing may include passing over the obstacle, avoiding the obstacle, and the like. Also, as shown in FIG. 23, the ground robot 331 may transfer a delivery item 335 to the drone 333 in response to determination that the obstacle 337 cannot be bypassed.

Here, the delivery item 335 may be transferred in any manner. For example, the ground robot 331 may transport the delivery item 335 while mounting the drone 333 and may activate the drone 333 when the obstacle 337 appears. It will be appreciated that the ground robot 331 may report, to the control system 230, that the obstacle 337 cannot be bypassed, and the drone 333 may be activated under the control of the control system 230. As another example, the ground robot 331 may call a drone located in the vicinity and may transfer the delivery item 335 to the drone.

In some embodiments, the ground robot 331 may determine whether to bypass a recognized obstacle 337 based on the size of the obstacle 337 and the fragility of the delivery item 335. In this case, the fragility refers to a degree to which the item is devalued due to damage, and may be determined to be a higher value as the item is of more substantial value (e.g., an expensive item), is fragile by its characteristics (e.g., an item made of a fragile material), and/or is greatly depreciated due to damage. In detail, for example, when a fragile delivery item is being transported, the ground robot 331 may determine that a recognized obstacle cannot be bypassed even though the obstacle is small (i.e., even though the ground robot 331 can sufficiently bypass the obstacle according to the performance of the robot). Thus, it is possible to provide a safer delivery service for a fragile item.

Figure 24:
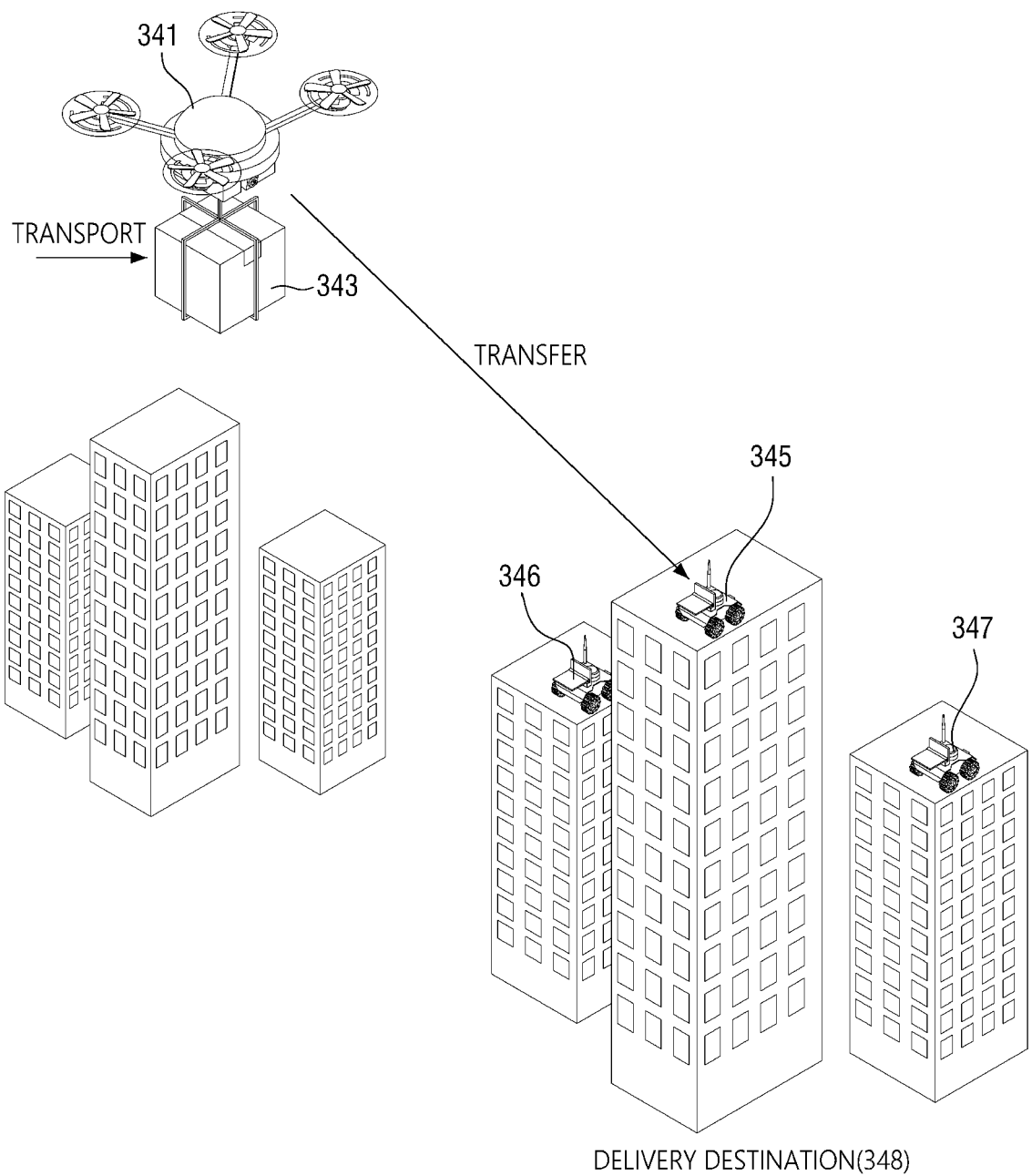
FIGS. 24 and 25 are example diagrams illustrating a collaborative delivery method according to a fourth embodiment of the present disclosure.
Figure 25:
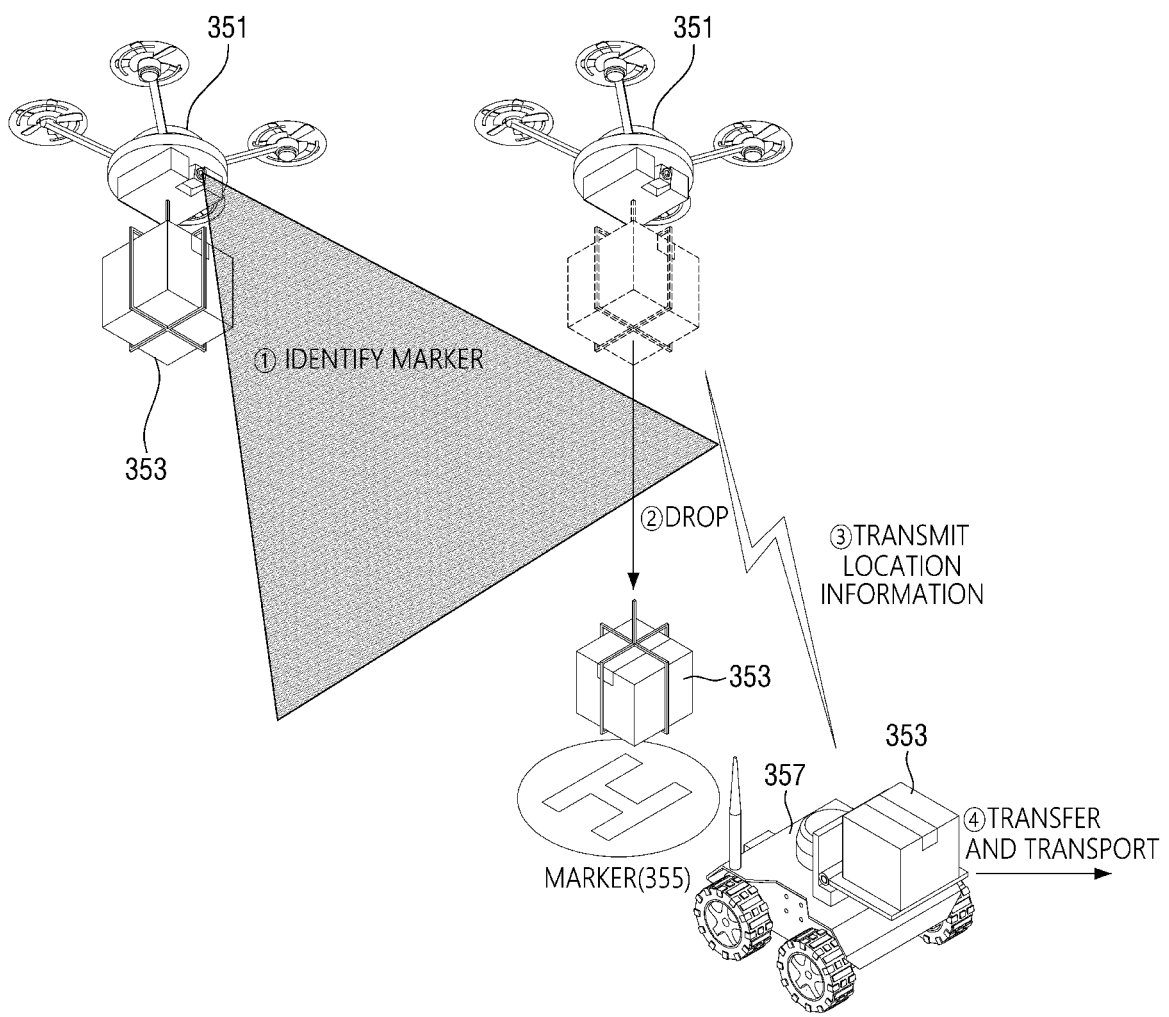

FIGS. 24 and 25 are example diagrams illustrating a collaborative delivery method according to a fourth embodiment of the present disclosure.

As shown in FIGS. 24 and 25, according to the fourth embodiment, a door-to-door delivery service may be provided through a drone (e.g., 341) and a ground robot (e.g., 345 to 347). In detail, air transport or inter-roof transport may be performed through the drone 341, and indoor delivery to the user's door may be accomplished through a ground robot 345 located on the rooftop of a delivery destination 348 (e.g., a transfer place).

FIG. 25 shows a process of transferring a delivery item 353 to a transfer place (e.g., the rooftop of a delivery destination building 348).

As shown in FIG. 25, a marker 355 for identifying a drone 351 may be pre-installed at a transfer place (e.g., a rooftop), and the location, shape, and the like of the marker 355 may be pre-defined according to mission information.

The drone 351 may identify the installed marker 355 through image capturing and drop the delivery item 353 in an area where the marker 355 is installed. A safety device may be pre-installed in the marker area to prevent the delivery item from being damaged. Subsequently, the drone 351 transmits drop location information (i.e., location information of the marker 355 area) to the ground robot 357. Then, the ground robot 357 may move to the location and receive the delivery item 353.

As reference, when a collaborative partner is not the ground robot 357 but a first drone, the drone 351 may transmit location information of the marker area to the first drone. Then, the first drone may receive the delivery item 353 and transport the delivery item 353 to the delivery destination. It will be appreciated that the first drone may also transfer the delivery item 353 to another ground robot.

Also, the aforementioned embodiment may be applied even to a case in which collaboration is performed between ground robots without substantially changing the technical spirit. For example, when a first ground robot places a delivery item in a marker area and then transmits location information of the marker area to a second ground robot, the second ground robot may receive the delivery item using the location information of the marker area.

The drop location information may be GPS information of the marker 355 area, image information obtained by capturing the marker 355 area, or the like, but the technical scope of the present disclosure is not limited thereto.

Figure 26:
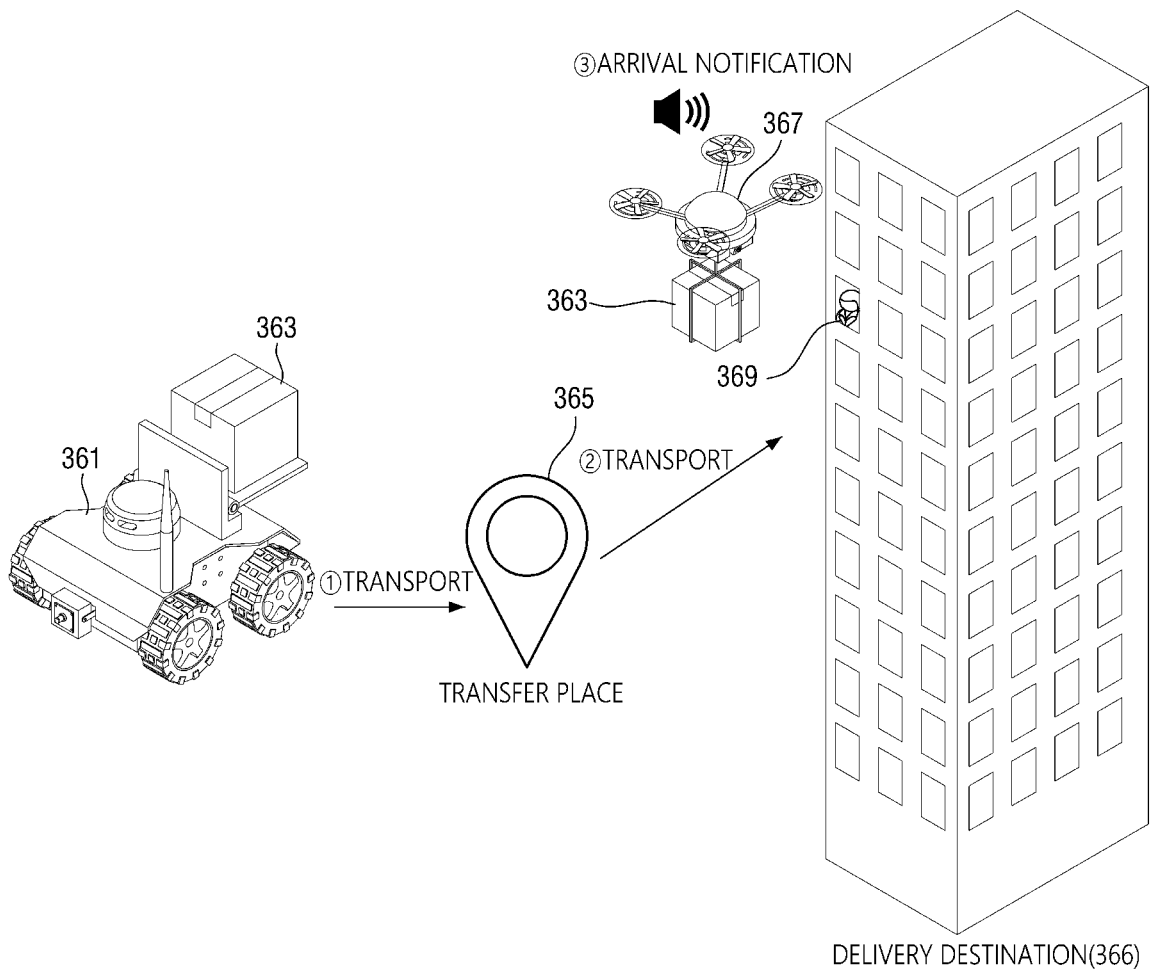
FIG. 26 is an example diagram illustrating a collaborative delivery method according to a fifth embodiment of the present disclosure.

FIG. 26 is an example diagram illustrating a collaborative delivery method according to a fifth embodiment of the present disclosure.

As shown in FIG. 26, the fifth embodiment relates to a collaborative delivery method for providing a door-to-door delivery service. In this embodiment, a ground robot 361 transfers a delivery item 363 to a drone 367 in a transfer place 365, and the drone 367 delivers the delivery item 363 to a user 369.

As shown in FIG. 26, the drone 367 may approach a place of residence of the user 369 in a delivery destination building 366 to deliver the delivery item 363. Height information (e.g., number of floors) of the residence place may be defined in mission information.

In some embodiments, the drone 367 may provide a delivery notification to the user 369 by continuously generating a visual or audio message in the vicinity of the delivery destination building 366. Alternatively, the drone 367 and/or the service system 200 may provide a delivery notification by transmitting a message to a terminal of the user 369.

In some embodiments, the drone 367 may identify the user 369 in a way shown in FIG. 19 and may provide an arrival notification only when the user 369 is identified.

Figure 27:
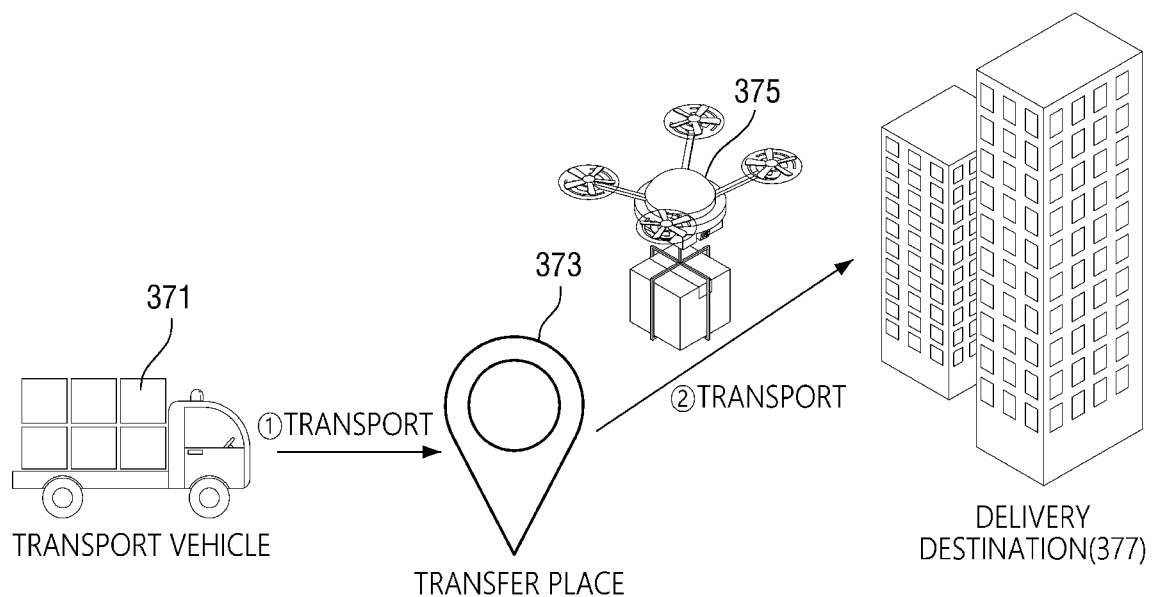
FIG. 27 is an example diagram illustrating a collaborative delivery method according to a sixth embodiment of the present disclosure.

FIG. 27 is an example diagram illustrating a collaborative delivery method according to a sixth embodiment of the present disclosure.

As shown in FIG. 27, according to the sixth embodiment, a drone 375 provides a delivery service in collaboration with a transport vehicle 371 (e.g., a parcel service vehicle). FIG. 27 shows an example in which the transport vehicle 371 provides a delivery service in collaboration with the drone 375, but the transport vehicle 371 may collaborate with a delivery robot (e.g., a ground robot) other than the drone 375.

As shown in FIG. 27, when the transport vehicle 371 transports a delivery item to a designated transfer place 373, the drone 375 may transport the delivery item to a delivery destination 377. In some embodiments, the drone 375 may provide a door-to-door delivery service, as shown in FIG. 26.

In some embodiments, the delivery destination 377 may refer to a place that the transport vehicle 371 cannot enter for various reasons. For example, the delivery destination 377 may refer to a place that the transport vehicle 371 cannot enter for geographical reasons (e.g., mountainous areas, island areas, and the like when an access road is narrow or absent) or legal reasons (e.g., areas that are legally restricted by vehicular access). Even in this case, according to this embodiment, the drone 375 may be utilized to accomplish delivery to the delivery destination 377. Accordingly, it is possible to greatly expand the delivery range.

The collaborative delivery methods according to various embodiments of the present disclosure have been described with reference to FIGS. 20 to 27. According to the aforementioned method, it is possible to provide a quick and safe delivery service through collaboration between a ground robot and a drone. In particular, the delivery range may be greatly expanded by performing delivery to a destination through a drone even though a ground robot cannot reach the destination. Furthermore, it is possible to significantly improve a customer's satisfaction by providing a door-to-door delivery service using a ground robot and a drone.

A method of safely delivering a large item in collaboration with a plurality of drones will be described below with reference to FIGS. 28 and 29.

Figure 28:
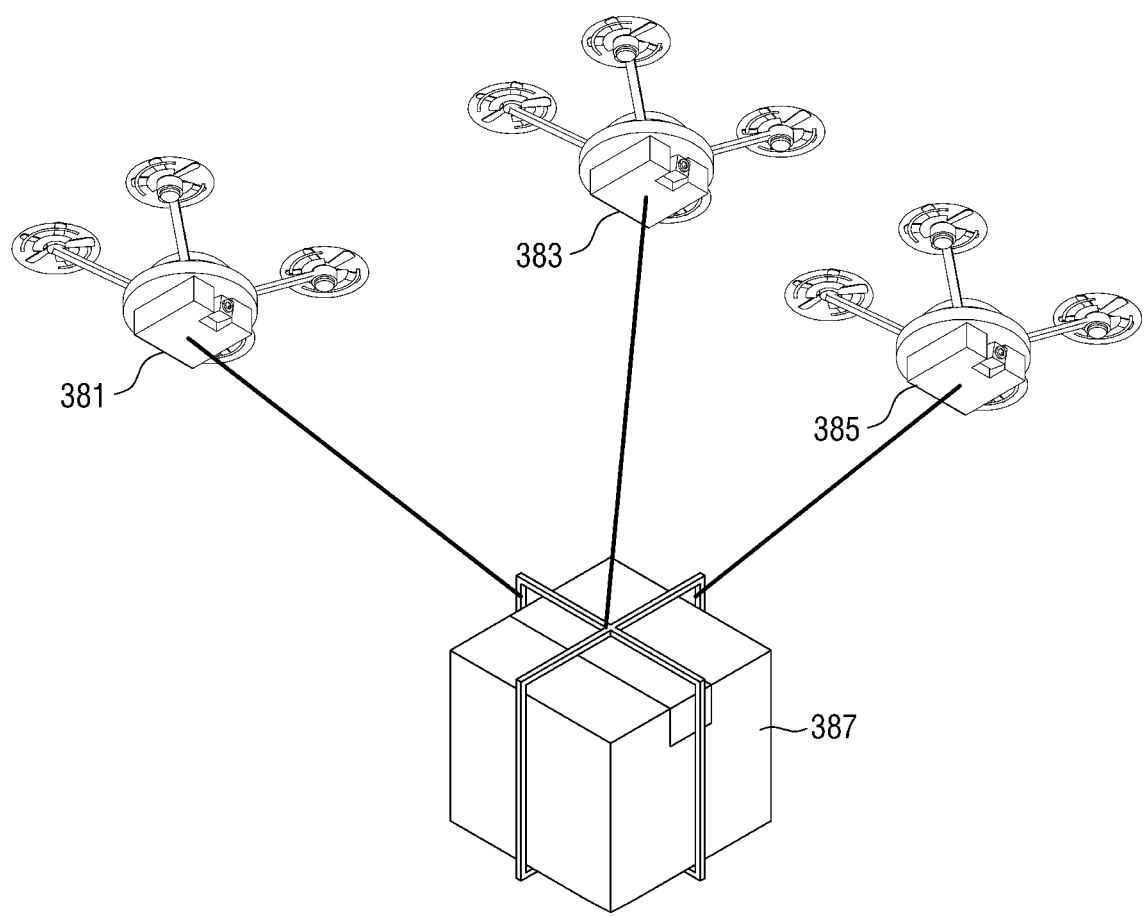
FIG. 28 is an example diagram illustrating a collaborative delivery method based on multiple drones according to a first embodiment of the present disclosure.

FIG. 28 is an example diagram illustrating a collaborative delivery method based on multiple drones according to a first embodiment of the present disclosure.

As shown in FIG. 28, the first embodiment relates to a method of safely delivering a large delivery item 387 using transmission ropes of the plurality of drones 381, 373, and 385. The large delivery item 387 may refer to an item with a weight greater than or equal to a threshold value, but the technical scope of the present disclosure is not limited thereto.

In order to safely deliver the large delivery item 387, it is important that the center of gravity of the large delivery item 387 is kept low while the drones 381, 383, and 385 are moving (i.e., it is important that the orientation of the large delivery item is kept balanced). To this end, each of the drones 381, 383, and 385 estimates the orientation of the large delivery item 387 based on various factors and determines whether the estimated orientation satisfies a predetermined balance condition. Also, each of the drones 381, 383, and 385 may adjust the length of the transmission rope or its relative location in response to determination that the balance condition is not satisfied.

In some embodiments, the factors may include the length of the transmission rope, the relative location of the drone, the direction of the transmission rope, and the like.

In some embodiments, the balance condition may be, for example, a condition based on a degree to which the large delivery item 387 is tilted (e.g., the large delivery item 387 is parallel to a level surface when the degree is 0), but the technical scope of the present disclosure is not limited thereto. Also, the balance condition may be more strictly set as the fragility of the delivery item 387 increases, but the technical scope of the present disclosure is not limited thereto.

Figure 29:
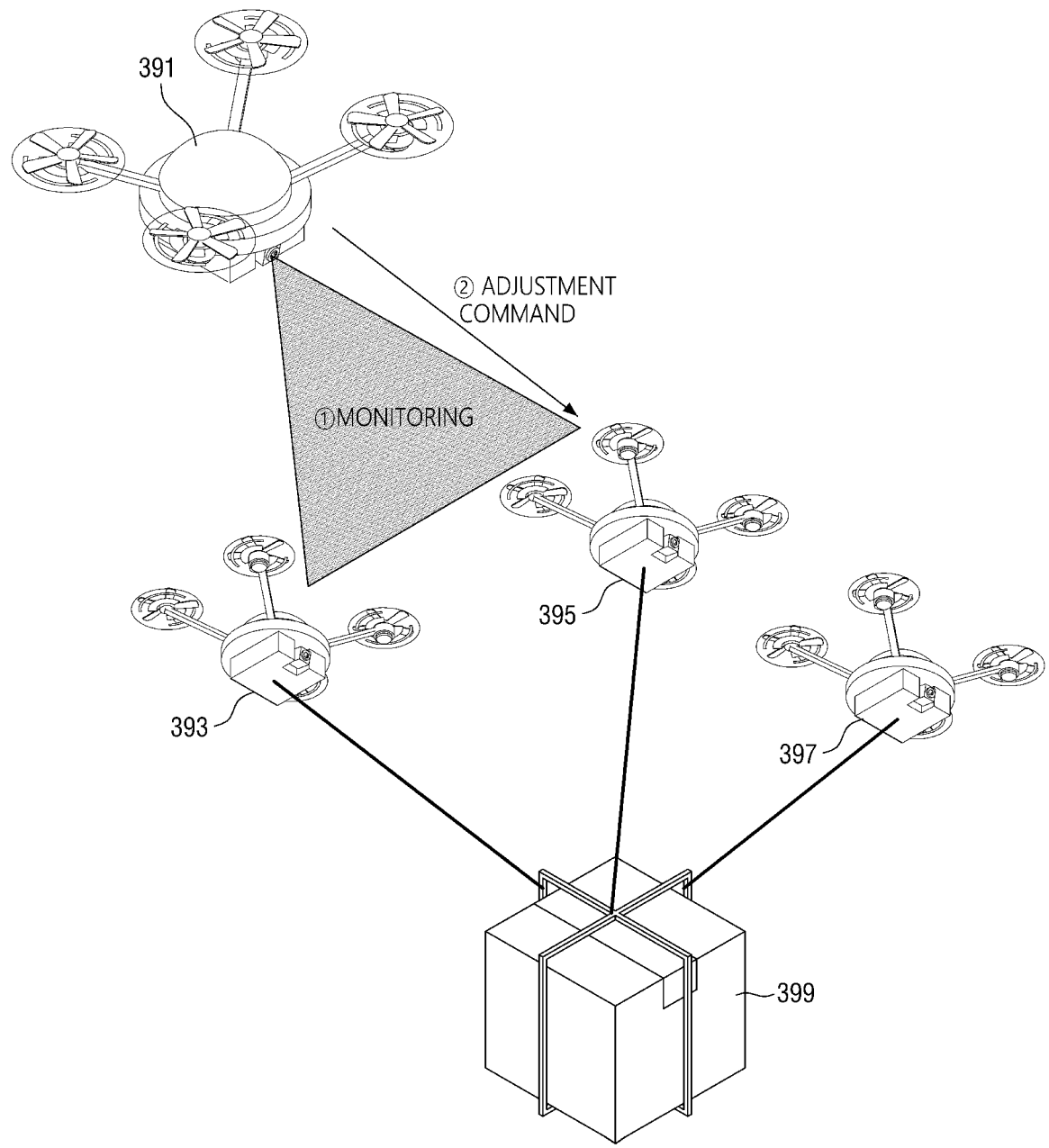
FIG. 29 is an example diagram illustrating a collaborative delivery method based on multiple drones according to a second embodiment of the present disclosure.

FIG. 29 is an example diagram illustrating a collaborative delivery method based on multiple drones according to a second embodiment of the present disclosure.

As shown in FIG. 29, according to the second embodiment, a specific drone 391 that does not participate in transport operates as a coordinator. In more detail, the coordinator drone 391 captures images of a large delivery item 399 and drones 393, 395, and 397 for transporting the large delivery item 399, analyzes the captured images, and measures the orientation of the large delivery item 399 and relative locations of the transport drones 393, 395, and 397.

Also, the coordinator drone 391 transmits an adjustment command to the specific drone (e.g., 395) in order to correct the orientation of the large delivery item 399 in response to determination that the orientation of the large delivery item 399 does not satisfy the predetermined balance condition. In this case, the adjustment command may include commands regarding adjustment of the location of the drone, adjustment of the length of the rope, and adjustment of the direction of the rope.

In this embodiment, the coordinator drone 391 may continuously monitor the transport drones 393, 395, and 397 and the large delivery item 399 and may perform continuous adjustment so that the orientation of the large delivery item 399 is kept balanced. Thus, it is possible to provide a more safe delivery service.

The method of safely delivering a large item in collaboration with a plurality of drones has been described with reference to FIGS. 28 and 29. According to the aforementioned method, it is possible to deliver a large item utilizing a plurality of drones, and it is also possible to provide a safe delivery service through orientation correction.

Various embodiments of the present disclosure for improving a customer's satisfaction while a food delivery service is provided will be described below with reference to FIGS. 30 to 32.

The following embodiments relate to a case in which food is delivered. In such an embodiment, a service system 200 may receive a delivery request (e.g., food order) from a user terminal 400 and may generate mission information for delivering food to a delivery destination in response to the request. Also, a mobile robot for delivering food (hereinafter referred to as a "delivery robot 405") may deliver the food based on the mission information. Hereinafter, various embodiments of the present disclosure will be described in detail with reference to FIGS. 30 to 32.

Figure 30:
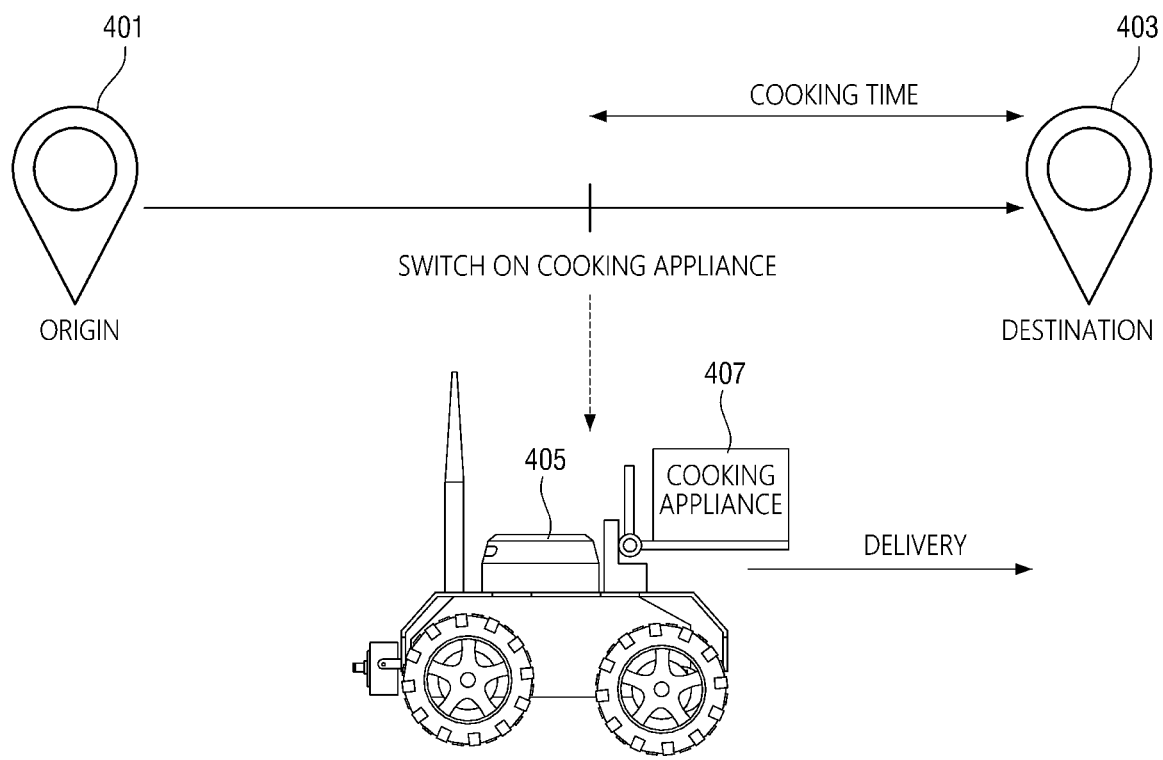
FIG. 30 is an example diagram illustrating a food delivery method using a mobile robot according to a first embodiment of the present disclosure.

FIG. 30 is an example diagram illustrating a food delivery method using a mobile robot according to a first embodiment of the present disclosure.

As shown in FIG. 30, according to the first embodiment, the delivery robot 405 delivers food with a cooking appliance containing the food. The delivery robot 405 performs food delivery based on mission information generated by the service system 200. Here, the mission information includes a cooking time for the food.

In this embodiment, while moving from an origin 401 to a destination 403, the delivery robot 405 calculates an expected time taken to reach the destination 403. The expected time may be calculated in any way. Also, the delivery robot 405 compares the cooking time for the food included in the mission information to the expected time and operates the cooking appliance 407 based on a result of the comparison. For example, when the expected time is the same as the cooking time, the delivery robot operates the cooking appliance 407 so that the food may be appropriately cooked when the destination 403 is reached. Thus, it is possible to provide an optimal food delivery service to a customer.

When a separate cooking time is not designated, the delivery robot 405 may deliver the food while activating the cooking appliance 407 in a warming or cooling state so that the taste or freshness of the food can be maintained.

The cooking appliance 407 refers to a tool having various cooking functions. For example, the cooking appliance 407 may be a tool having various cooking functions such as heating, cooling, frying, warming, cooking, and baking. Accordingly, the delivery robot 405 may cook food using the cooking appliance 407 (e.g., warming pizza, frying fritters, boiling stew, steaming rice, or baking pizza in an oven) while delivering the food, and the customer may receive the just-cooked food.

As surrounding situations (e.g., a traffic volume) change, an actual time taken to reach the destination 403 may differ from the expected time. For example, the expected time may be longer or shorter than the actual time. In this case, the delivery robot 405 may adjust a cooking completion time of the food to an arrival time by adjusting cooking intensity (e.g., heating intensity) of the cooking appliance 407.

In more detail, the delivery robot 405 may periodically update the expected time taken to reach the delivery destination 403 and may adjust the cooking intensity of the cooking appliance 407 according to the updated expected time. For example, when the updated expected time is longer than before, the delivery robot 405 may adjust the cooking intensity of the cooking appliance 407 to be low. Otherwise, the delivery robot 405 may adjust the cooking intensity of the cooking appliance 407 to be high.

In some embodiments, the delivery robot 405 may monitor a cooking status of the contained food by using a sensor included in the cooking appliance 407. For example, an image sensor, a temperature sensor, and the like may be used to monitor the cooking status of the food. Also, the delivery robot 405 may adjust the cooking intensity of the cooking appliance 407 based on the monitored cooking status. For example, the cooking intensity may be adjusted to be high or low depending on the cooking status.

Also, in some embodiments, the delivery robot 405 may sense surrounding environments and calculate a risk of accident for a current route based on the sensing data. Also, the delivery robot 405 may adjust the route to the delivery destination to another route in response to determination that the calculated risk of accident is greater than or equal to a threshold value. This is because food may be more perishable than other delivery items. Thus, it is possible to provide a safe delivery service to the destination 403.

The threshold value may be a predetermined constant or a variable varying depending on situations. For example, the threshold value may be a variable determined based on the perishability of the contained food. Here, the perishability refers to a degree to which the food is devalued due to damage, and may be determined to be a higher value as the food is of more substantial value (e.g., expensive food), is more perishable by its characteristics (e.g., perishable food such as pizza toppings), and/or is greatly depreciated due to damage. In more detail, for example, when perishable food is being transported, the perishability may be determined to be a value lower than the threshold value so that the delivery is performed through a safer route.

The specific method of calculating the risk of accident may vary depending on the embodiment.

In some embodiments, the risk of accident may be calculated based on at least one of the curvature and slope of a road ahead. For example, a higher value may be calculated as the risk of accident as the curvature or slope of the road increases.

In some embodiments, the risk of accident may be calculated based on a result of recognizing an object located within a certain distance. The object recognition result may be acquired through image analysis. Here, the object recognition result may include the number of moving objects and a degree of irregularity of movement of an object. For example, as still another example, as the number of mobile objects showing irregular movement patterns increases, the level of complexity may be determined to be a higher value.

In some embodiments, the risk of accident may be calculated in a manner similar to those of the risk of collision and the level of complexity of surrounding environments. The foregoing should be referred to by the method of calculating the risk of collision and the method of calculating the level of complexity of surrounding environments.

In some embodiments, the risk of accident may be calculated based on a combination of the aforementioned embodiments.

Also, according to some embodiments of the present disclosure, the ground robot 405 may transfer the cooking appliance 407 to a drone in response to determination that the risk of accident is greater than or equal to a threshold value. Thus, through the drone, it is possible to accomplish a safe delivery, and it is also possible to provide a door-to-door delivery service. Depending on the embodiment, it will be appreciated that a drone may transfer a cooking appliance to a ground robot. For example, when surrounding environments are complex so that flight is difficult (i.e., when the risk of accident is high), a drone may transfer a cooking appliance to a ground robot.

Figure 31:
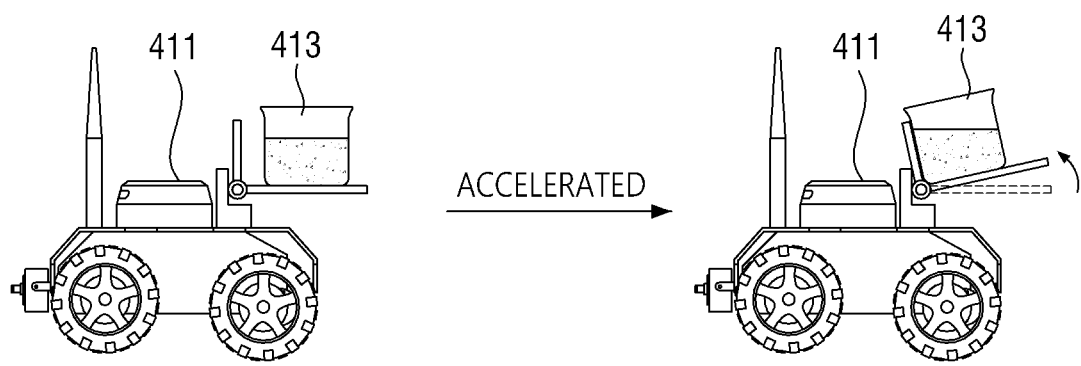
FIGS. 31 and 32 are example diagrams illustrating a food delivery method using a mobile robot according to a second embodiment of the present disclosure.
Figure 32:
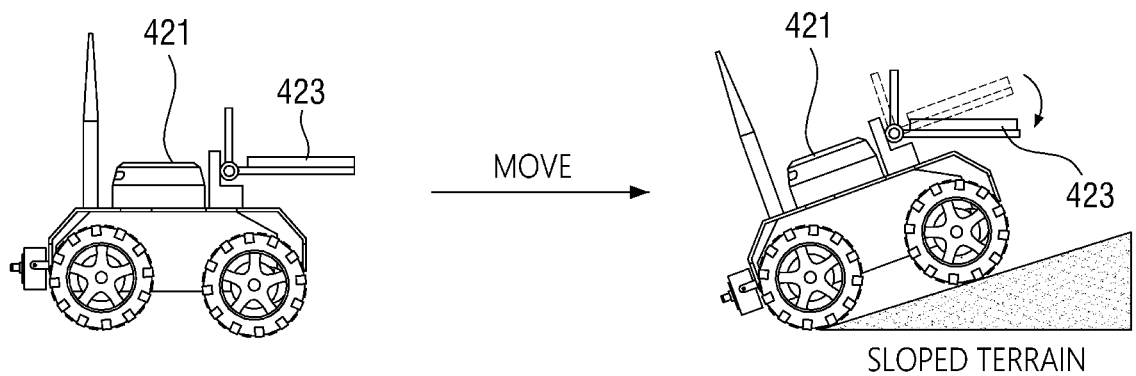

FIGS. 31 and 32 are example diagrams illustrating a food delivery method using a mobile robot according to a second embodiment of the present disclosure.

As shown in FIGS. 31 and 32, the second embodiment relates to a method of providing a safe delivery service by adjusting the orientation of a deliver container (e.g., a cooking appliance) with food.

In the second embodiment, delivery robots 411 and 421 may adjust the orientation of the delivery container while moving according to a first adjustment scheme when the food is of a first type and may adjust the orientation of the delivery container while moving according to a second adjustment scheme when the food is of a second type. That is, depending on the type of food, it is possible to accomplish the safe delivery with optimal orientation.

Here, the type of the food may be classified into liquid food such as soup and stew and non-liquid food such as pizza and steamed rice, but the technical scope of the present disclosure is not limited thereto.

FIG. 31 illustrates a method of adjusting the orientation of a delivery container with respect to liquid food.

As shown in FIG. 31, when a delivery robot 411 is accelerated, the surface of the food may be sloped due to reaction acceleration, and thus the liquid food may spill over from the delivery container 413. In order to prevent such a problem, the delivery robot 411 may adjust the orientation of the delivery container 413 to cancel the reaction acceleration.

In more detail, the delivery robot 411 may measure the surface slope of the food in the delivery container 413 and may adjust the orientation of the delivery container 413 to lower the surface slope. The measurement of the surface slope may be performed through image analysis, but the technical scope of the present disclosure is not limited thereto. For example, when the surface slope occurs due to the reaction acceleration, the delivery robot 411 may tilt the delivery container 413 so that the surface of food is parallel to a level surface, as shown in FIG. 31. Thus, it is possible to prevent the liquid food from spilling over from the delivery container 413.

In some embodiments, the delivery robot 411 may measure driving acceleration and may adjust the orientation of the delivery container 413 based on the magnitude of the driving acceleration. For example, the reaction acceleration may increase as the driving acceleration increases. Accordingly, the delivery robot 411 may adjust the orientation of the delivery container 413 to further tilt the delivery container 413 (i.e., so that the surface of the food is parallel to a horizontal plane).

As reference, FIG. 31 shows an example in which the delivery robot 411 is accelerated on a flat road. However, it should be noted that the aforementioned technical spirit may be applied to a case in which a road is tilted or curved or a case in which a drone is accelerated in the air. In any case, the delivery robot 411 may adjust the orientation of the delivery container 413 to lower the surface slope of the food contained in the delivery container 413.

FIG. 32 illustrates a method of adjusting the orientation of a delivery container with respect to non-liquid food.

As shown in FIG. 32, a delivery robot 421 may measure a ground slope and may adjust the orientation of the delivery container 423 based on the ground slope. For example, when the delivery robot 421 is moving in a sloped terrain, the delivery robot 421 may adjust the orientation of the delivery container 423 so that the delivery container 423 or the food contained in the delivery container 423 is parallel to a horizontal plane. Thus, it is possible to accomplish safe delivery while maintaining the appearance of food (e.g., while preventing pizza toppings from shifting from one side to another.

As reference, FIG. 32 shows an example in which the delivery robot 421 is traveling in a vertically sloped area. However, it should be noted that the aforementioned technical spirit may be applied to a case in which a road is horizontally tilted or curved or a case in which a drone is accelerated in mid-air. In any case, the delivery robot 421 may adjust the orientation of the delivery container 413 to keep the orientation of the delivery container 413 parallel to a horizontal surface.

Various embodiments of the present disclosure associated with a food delivery service have been described with reference to FIGS. 30 to 32. As described above, just-cooked food may be delivered to a customer by cooking while moving. Accordingly, it is possible to improve a customer's satisfaction. Furthermore, it is possible to provide a safe delivery service by adjusting the orientation of the delivery container according to the type of food. Accordingly, it is possible to further enhance a customer's satisfaction.

An example computing apparatus 500 capable of implementing apparatuses (e.g., 100, 210, and 300) and/or systems (e.g., 230 and 250) according to various embodiments of the present disclosure will be described below with reference to FIG. 33.

Figure 33:
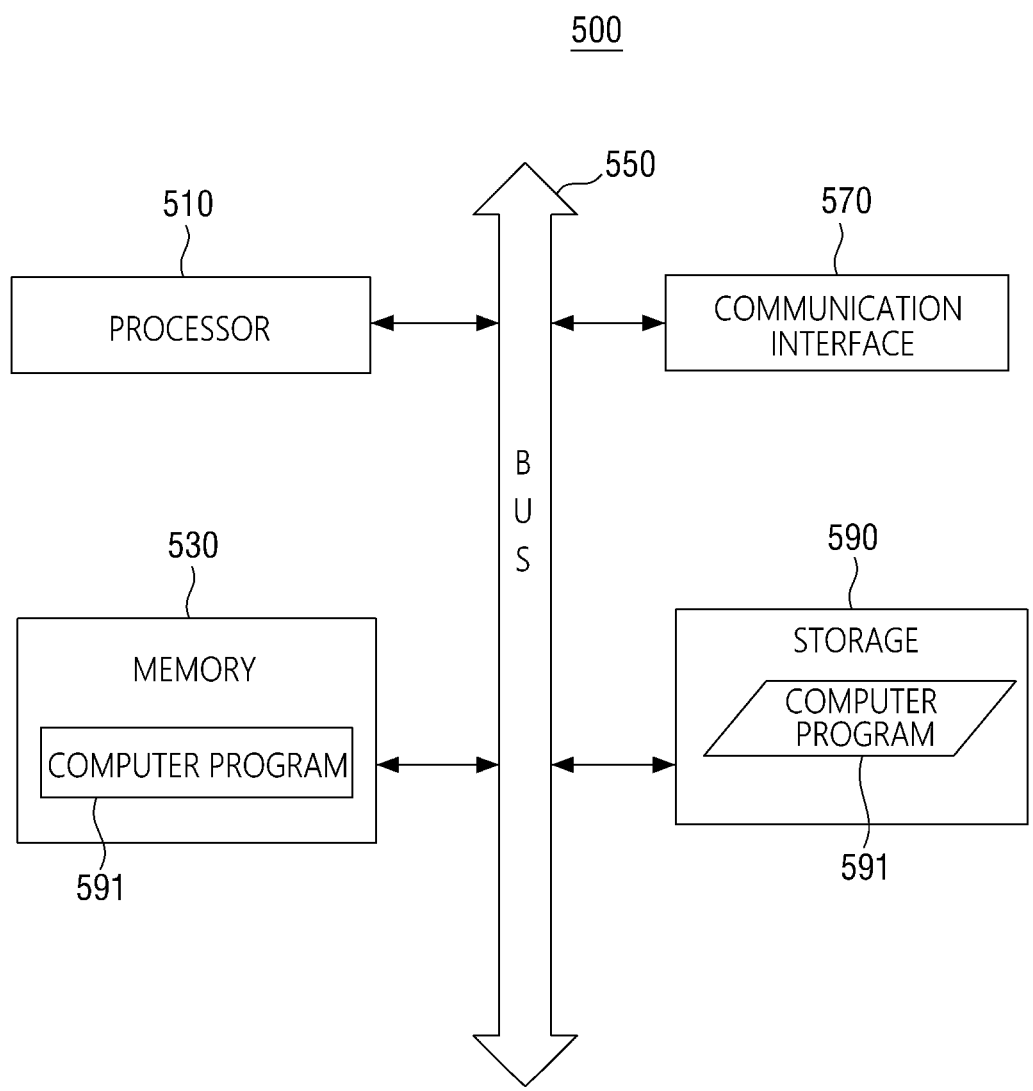
FIG. 33 is an example hardware configuration diagram illustrating an example computing apparatus capable of implementing an apparatus and/or a system according to various embodiments of the present disclosure.

FIG. 33 is an example hardware configuration diagram showing the example computing apparatus 500.

As shown in FIG. 33, the computing apparatus 500 may include at least one processor 510, a bus 550, a communication interface 570, a memory configured to load a computer program 591 performed by the processor 510, and a storage 590 configured to store the computer program 591. However, only elements related to the embodiment of the present disclosure are shown in FIG. 33. Accordingly, it is to be understood by those skilled in the art that general-purpose elements other than the elements shown in FIG. 33 may be further included.

The processor 510 controls overall operation of each element of the computing apparatus 500. The processor 510 may be configured to include a central processing unit (CPU), a micro processor unit (MPU), a micro controller unit (MCU), a graphic processing unit (GPU), or any type of processor that is well known in the art. Also, the processor may perform computation on at least one application or program for executing the methods according to the embodiments of the present disclosure. The computing apparatus 500 may have one or more processors.

The memory 530 stores various kinds of data, commands, and/or information. The memory 530 may load the computer program 591 from the storage 590 to perform the methods/operations according to various embodiments of the present disclosure. The memory 530 may be implemented with a volatile memory such as a random access memory (RAM), but the technical scope of the present disclosure is not limited thereto.

The bus 550 provides a communication function between the elements of the computing apparatus 500. The bus 550 may be implemented with various types of buses such as an address bus, a data bus, and a control bus.

The communication interface 570 supports wired or wireless Internet communication of the computing apparatus 500. Also, the communication interface 570 may support various communication schemes other than Internet communication. To this end, the communication interface 570 may be configured to include a communication module that is well known in the art.

The storage 590 may non-temporarily store one or more programs 591. The storage 590 may be configured to include a non-volatile memory such as a read only memory (ROM), an erasable programmable ROM (EPROM), an electrically erasable programmable ROM (EEPROM), and a flash memory, a hard disk, a removable disk, or any computer-readable recording medium that is well know in the art.

The computer program 591 may include one or more instructions that allow the processor 510 to perform the operations/methods according to various embodiments of the present disclosures when the computer program 591 is loaded in the memory 530. The processor 510 may perform the operations/methods according to various embodiments of the present disclosure by executing the one or more instructions.

For example, the computer program 591 may include instructions for performing an operation of acquiring a remote control value for the mobile robot 30, which is input through the remote control system 20, an operation of acquiring an autonomous control value for the mobile robot 30, which is generated by an autonomous driving module, an operation of determining a weight for each control value based on a delay between the mobile robot 30 and the remote control system 20, and an operation of generating a target control value of the mobile robot 30 based on the determined weight, a first control value, and a second control value. In this case, the control apparatus 100 may be implemented through the computing apparatus 500.

The example computing apparatus 500 capable of implementing the apparatuses and/or systems according to various embodiments of the present disclosure has been described with reference to FIG. 33.

So far, some embodiments of the present disclosure and the effect according to embodiments have been aforementioned with reference to FIGS. 1 to 33. It should be noted that the effects of the present disclosure are not limited to the above-described effects, and other effects will be apparent to those skilled in the art from the following descriptions.

The concepts of the disclosure described above with reference to FIGS. 1 to 33 can be embodied as computer-readable code on a computer-readable medium. The computer-readable medium may be, for example, a removable recording medium (a CD, a DVD, a Blu-ray disc, a USB storage apparatus, or a removable hard disc) or a fixed recording medium (a ROM, a RAM, or a computer-embedded hard disc). The computer program recorded on the computer-readable recording medium may be transmitted to another computing apparatus via a network such as the Internet and installed in the computing apparatus. Hence, the computer program can be used in the computing apparatus.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

While the present disclosure has been particularly illustrated and described with reference to exemplary embodiments thereof, it will be understood by those of ordinary skill in the art that various changes in form and detail may be made therein without departing from the spirit and scope of the present disclosure as defined by the following claims. The exemplary embodiments should be considered in a descriptive sense only and not for purposes of limitation.

What is claimed is:

1. A method of controlling a mobile robot, the method being performed by a control apparatus, the method comprising:
    acquiring a first control value for the mobile robot, which is input through a remote control apparatus;
    acquiring a second control value for the mobile robot, which is generated by an autonomous driving module;

determining a weight for each control value based on a delay between the mobile robot and the remote control apparatus; and generating a target control value of the mobile robot in combination of the first control value and the second control value based on the determined weights, wherein a first weight for the first control value and a second weight for the second control value are inversely proportional to each other.

2. The method of claim 1, further comprising adjusting the target control value so that a difference between the target control value and the first control value is less than or equal to a threshold value in response to determination that the difference is greater than or equal to the threshold value.

3. The method of claim 1, wherein the determining the weight for each control value comprises:
   determining whether the delay is greater than or equal to a threshold value;
   determining the first weight as a maximum value within a designated range in response to determination that the delay is greater than or equal to the threshold value; and
   determining the second weight as a minimum value within the designated range in response to determination that the delay is greater than or equal to the threshold value.

4. The method of claim 3, wherein the threshold value is determined based on a current speed of the mobile robot.

5. The method of claim 1, wherein the determining the weight for each control value comprises:
   determining a risk of collision with an object near the mobile robot based on sensing data of the mobile robot; and
   determining the weight for each control value further based on the risk of collision.

6. The method of claim 1, wherein the determining the weight for each control value comprises:
   determining a level of complexity of surrounding environments of the mobile robot based on sensing data of the mobile robot; and
   determining the weight for each control value further based on the level of complexity.

7. The method of claim 6,
   wherein the sensing data of the mobile robot includes image data, and
   wherein the determining the level of complexity of surrounding environments comprises:
   acquiring a result of recognizing the object near the mobile robot from the image data; and
   determining the level of complexity based on the recognition result.

8. The method of claim 1, further comprising acquiring a third control value for the mobile robot, which is generated based on a machine learning model that learns a driving pattern of a user who controls the remote control apparatus, wherein the generating the target control value of the mobile robot comprises generating the target control value further based on the third control value.

9. The method of claim 1, further comprising acquiring a third control value for the mobile robot, which is generated based on a machine learning model that learns a driving pattern of a plurality of users, wherein the generating the target control value of the mobile robot comprises generating the target control value further based on the third control value.

* * * * *